(12) United States Patent
Bailey

(10) Patent No.: US 7,992,382 B2
(45) Date of Patent: *Aug. 9, 2011

(54) PARTICULATE TRAP SYSTEM AND METHOD

(75) Inventor: John M. Bailey, Dunlap, IL (US)

(73) Assignee: Illinois Valley Holding Company, Chillicothe, IL (US)

( * ) Notice: Subject to any disclaimer, the term of this patent is extended or adjusted under 35 U.S.C. 154(b) by 1098 days.

This patent is subject to a terminal disclaimer.

(21) Appl. No.: 11/593,249

(22) Filed: Nov. 6, 2006

(65) Prior Publication Data

US 2010/0269488 A1 Oct. 28, 2010

Related U.S. Application Data

(63) Continuation-in-part of application No. 11/189,304, filed on Jul. 26, 2005, now Pat. No. 7,273,514, which is a continuation of application No. 10/467,553, filed on Aug. 1, 2003, now Pat. No. 6,989,045, application No. 11/593,249, which is a continuation-in-part of application No. 10/846,780, filed on May 14, 2004, now Pat. No. 7,269,942.

(60) Provisional application No. 60/734,164, filed on Nov. 7, 2005, provisional application No. 60/763,409, filed on Jan. 30, 2006.

(51) Int. Cl.
    *F01N 3/00* (2006.01)

(52) U.S. Cl. ............... 60/296; 60/274; 60/281; 60/287; 60/292; 60/297

(58) Field of Classification Search ............ 60/284–299, 60/273; 96/125
See application file for complete search history.

(56) References Cited

U.S. PATENT DOCUMENTS 3,899,326 A 8/1975 Frost et al.

(Continued)

FOREIGN PATENT DOCUMENTS

JP 04-031613 2/1992

OTHER PUBLICATIONS www.dieselnet.com/tech/dpf_regen.html; Diesel Filter Regeneration [subscription], pp. 1-18; DieselNet Technology Guide, Diesel Particulate Filters; Revision 2005.06a.

(Continued)

*Primary Examiner* — Thomas E Denion
*Assistant Examiner* — Jesse Bogue
(74) *Attorney, Agent, or Firm* — Philip L. Bateman

(57) ABSTRACT

A particulate trap system for an internal combustion engine includes a plurality of contiguous porous walls, and a remotely actuated relief valve downstream of said trap for periodically creating a reverse pressure throughout the exhaust system upstream of the relief valve and including said trap. A reversing apparatus periodically creates a reverse pressure drop across a portion of the contiguous porous walls of said trap to dislodge accumulated particulate and cause a portion of the filtered exhaust gas to flow back through said portion of the contiguous porous walls to remove particulate therefrom. A control system actuates the relief valve and the reversing apparatus. In one embodiment the system is utilized on a vehicle and the reversing apparatus includes a relief valve that is also operative as an exhaust brake. Regeneration includes the steps of: creating a backpressure in the entire exhaust system from a location downstream of the trap; creating a reverse pressure drop across only a portion of the porous walls to dislodge accumulated particulate therefrom; and causing a portion of filtered exhaust gas to flow back through said portion of the porous walls to carry the dislodged particulate out of the trap.

28 Claims, 24 Drawing Sheets

U.S. PATENT DOCUMENTS

| | | | |
|---|---|---|---|
| 3,919,384 A | 11/1975 | Cantaloupe et al. | |
| 3,954,672 A | 5/1976 | Somers et al. | |
| 4,129,429 A | 12/1978 | Humbert, Jr. et al. | |
| 4,276,071 A | 6/1981 | Outland | |
| 4,343,604 A | 8/1982 | Minjolie et al. | |
| 4,390,355 A | 6/1983 | Hammond, Jr. et al. | |
| 4,416,676 A | 11/1983 | Montierth | |
| 4,419,108 A | 12/1983 | Frost et al. | |
| 4,420,316 A | 12/1983 | Frost et al. | |
| 4,423,090 A | 12/1983 | Hammond, Jr. et al. | |
| 4,427,423 A | 1/1984 | Montierth | |
| 4,478,618 A | 10/1984 | Bly et al. | |
| 4,544,388 A | 10/1985 | Rao et al. | |
| 4,557,682 A | 12/1985 | Montierth | |
| 4,622,051 A | 11/1986 | Polach et al. | |
| 4,649,703 A | 3/1987 | Dettling et al. | |
| 4,731,010 A | 3/1988 | Cunningham | |
| 4,741,792 A | 5/1988 | Matsuhisa | |
| 4,752,516 A | 6/1988 | Montierth | |
| 4,791,792 A | 12/1988 | Naruse et al. | |
| 4,812,276 A | 3/1989 | Chao | |
| 4,823,549 A | 4/1989 | Moser | |
| 4,835,963 A | 6/1989 | Hardy | |
| 4,857,089 A | 8/1989 | Kitagawa et al. | |
| 4,858,431 A * | 8/1989 | Leonhard et al. | 60/297 |
| 4,864,821 A | 9/1989 | Hoch | |
| 4,875,336 A * | 10/1989 | Hayashi et al. | 60/286 |
| 4,923,487 A | 5/1990 | Bogart et al. | |
| 5,009,065 A | 4/1991 | Howe et al. | |
| 5,013,340 A * | 5/1991 | Taslim et al. | 55/290 |
| 5,016,437 A | 5/1991 | Huether et al. | |
| 5,019,142 A | 5/1991 | Waschkuttis | |
| 5,123,243 A | 6/1992 | Baddour | |
| 5,174,969 A | 12/1992 | Fischer et al. | |
| 5,227,105 A | 7/1993 | Eucker et al. | |
| 5,228,892 A | 7/1993 | Akitsu et al. | |
| 5,238,472 A | 8/1993 | Pfister et al. | |
| 5,240,485 A | 8/1993 | Haerle et al. | |
| 5,240,663 A | 8/1993 | Stringaro et al. | |
| 5,246,472 A | 9/1993 | Herman et al. | |
| 5,253,476 A | 10/1993 | Levendis et al. | |
| 5,318,323 A | 6/1994 | Pietz | |
| 5,357,755 A | 10/1994 | Gillingham et al. | |
| 5,367,889 A | 11/1994 | Lanyon | |
| 5,426,936 A | 6/1995 | Levendis et al. | |
| 5,487,863 A | 1/1996 | Cunningham et al. | |
| 5,489,319 A | 2/1996 | Tokunda et al. | |
| 5,497,620 A | 3/1996 | Stobbe | |
| 5,552,102 A | 9/1996 | Kragle et al. | |
| 5,566,545 A | 10/1996 | Hijkata et al. | |
| 5,571,298 A | 11/1996 | Buck | |
| 5,606,854 A | 3/1997 | Hoffmann | |
| 5,638,926 A | 6/1997 | McCrickard | |
| 5,702,659 A | 12/1997 | Kragle et al. | |
| 5,725,618 A * | 3/1998 | Shimoda et al. | 55/283 |
| 5,851,249 A | 12/1998 | Henda | |
| 5,853,438 A | 12/1998 | Igarashi | |
| 5,930,994 A * | 8/1999 | Shimato et al. | 60/274 |
| 5,930,995 A | 8/1999 | Watanabe et al. | |
| 6,010,547 A * | 1/2000 | Jeong et al. | 55/282.3 |
| 6,148,613 A * | 11/2000 | Klopp et al. | 60/296 |
| 6,233,926 B1 | 5/2001 | Bailey et al. | |
| 6,989,045 B2 | 1/2006 | Bailey et al. | |
| 7,314,501 B2 * | 1/2008 | Fayard | 95/14 |

OTHER PUBLICATIONS www.dieselnet.com/tech/dpf_wall-flow.html; Wall-Flow Monolith [subscription], pp. 1-30; DieselNet Technology Guide, Diesel Filter Materials; Revision 2005.09.

www.usgear.cc/dcelerator.htm; D-Celerator Diesel Exhaust Brake; Copyright 2006 AP Products, Inc.

* cited by examiner

SINGLE PARTICULATE TRAP CONTROL
(REGENERATION INITIATED EVERY TWO HOURS)

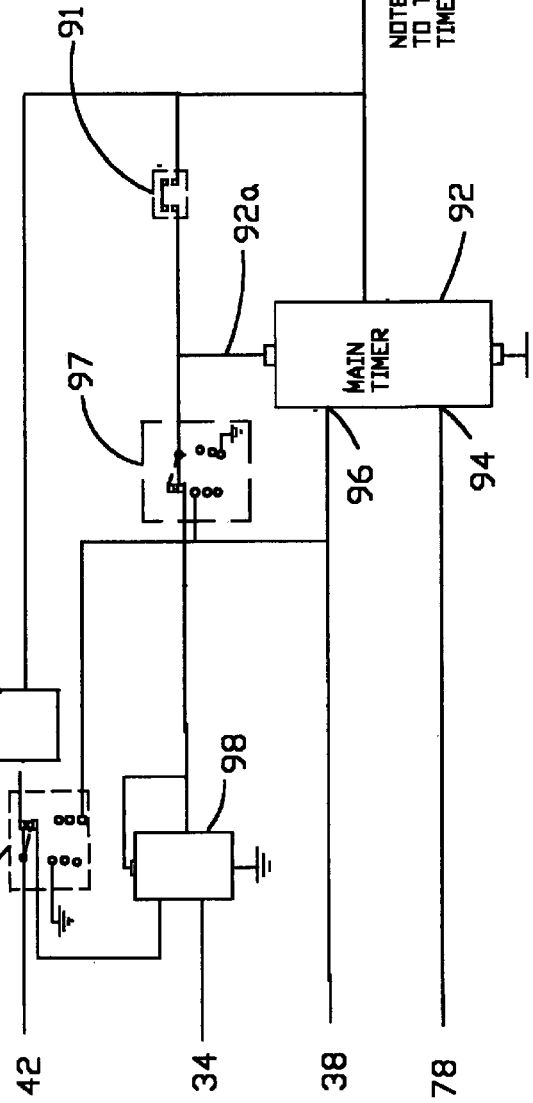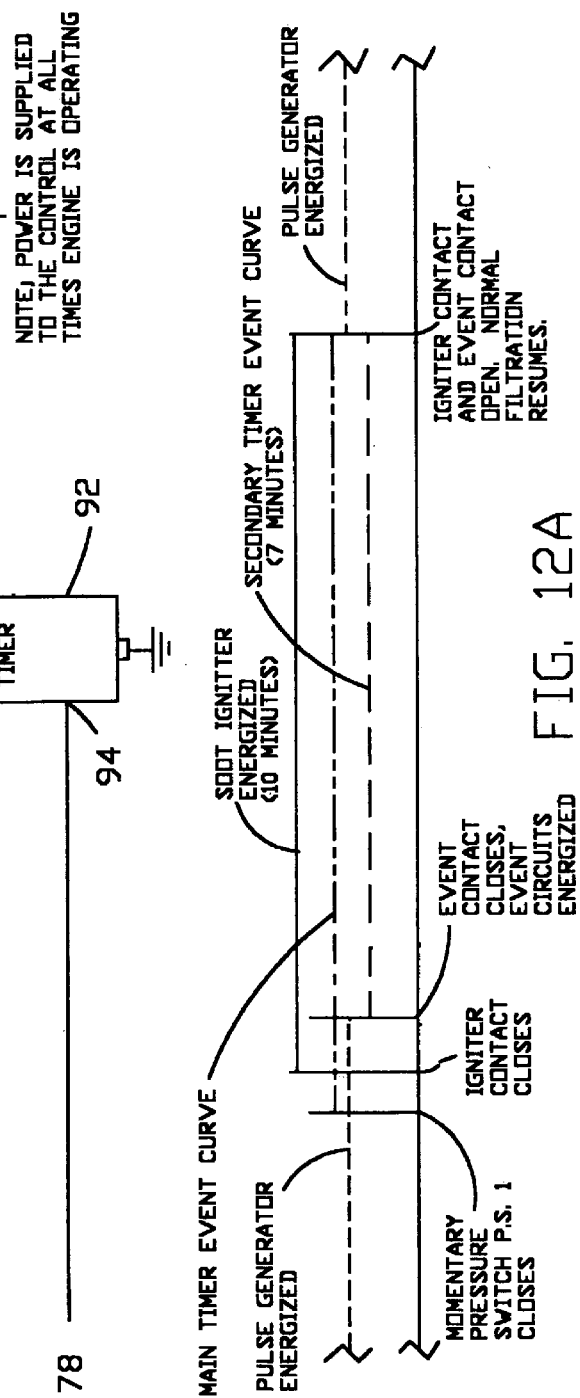

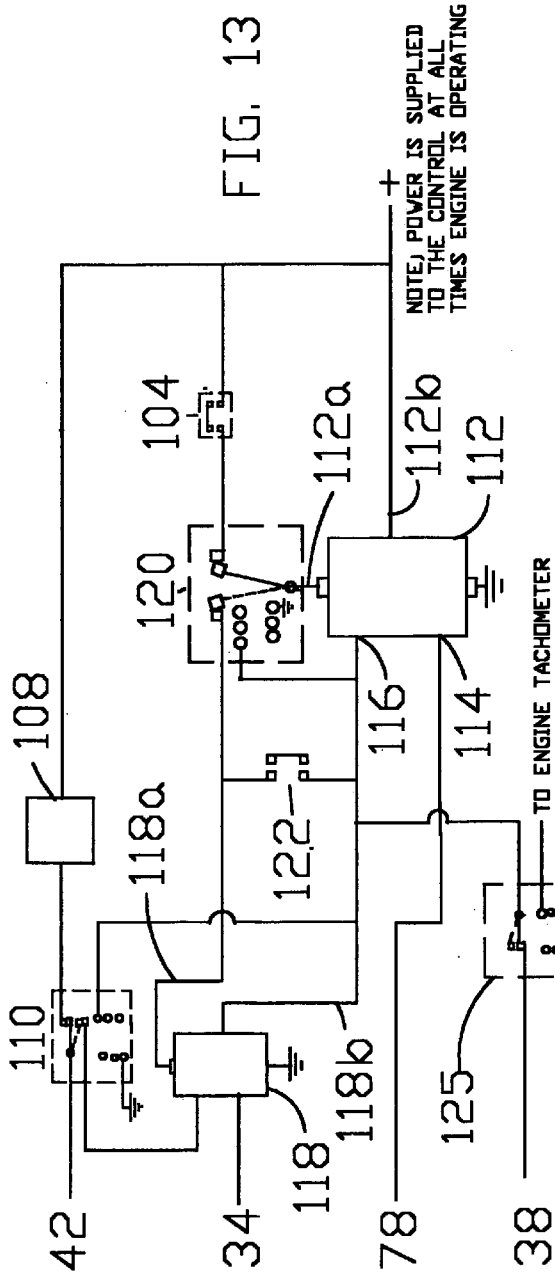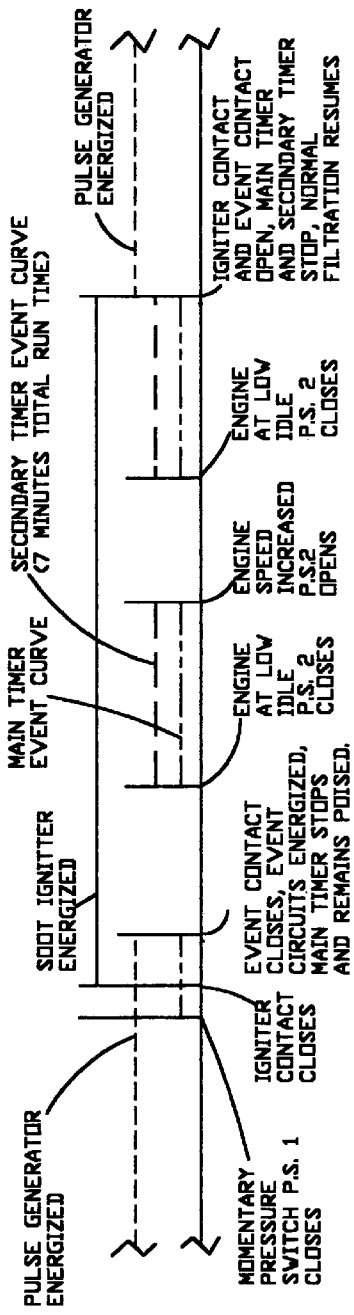

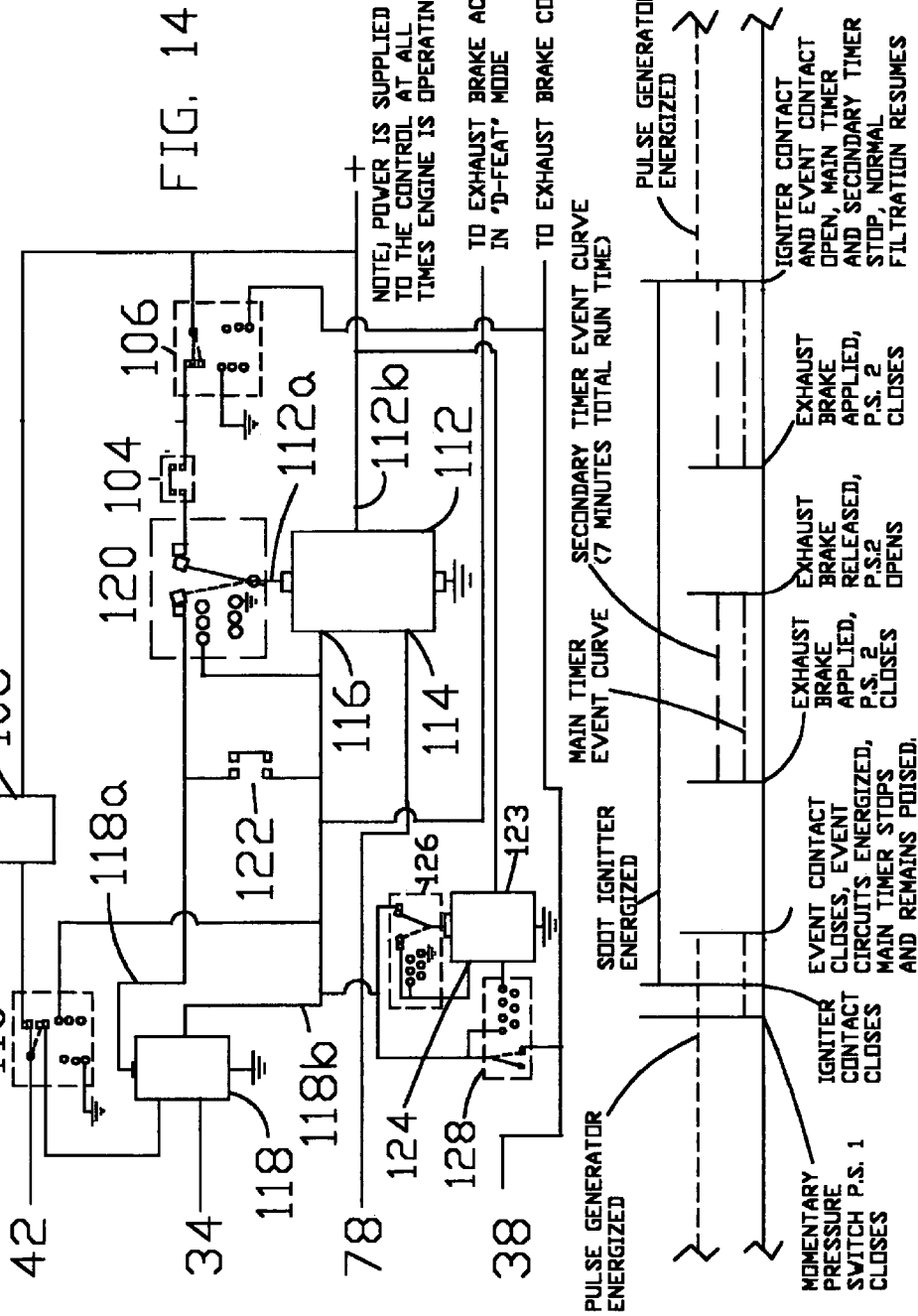

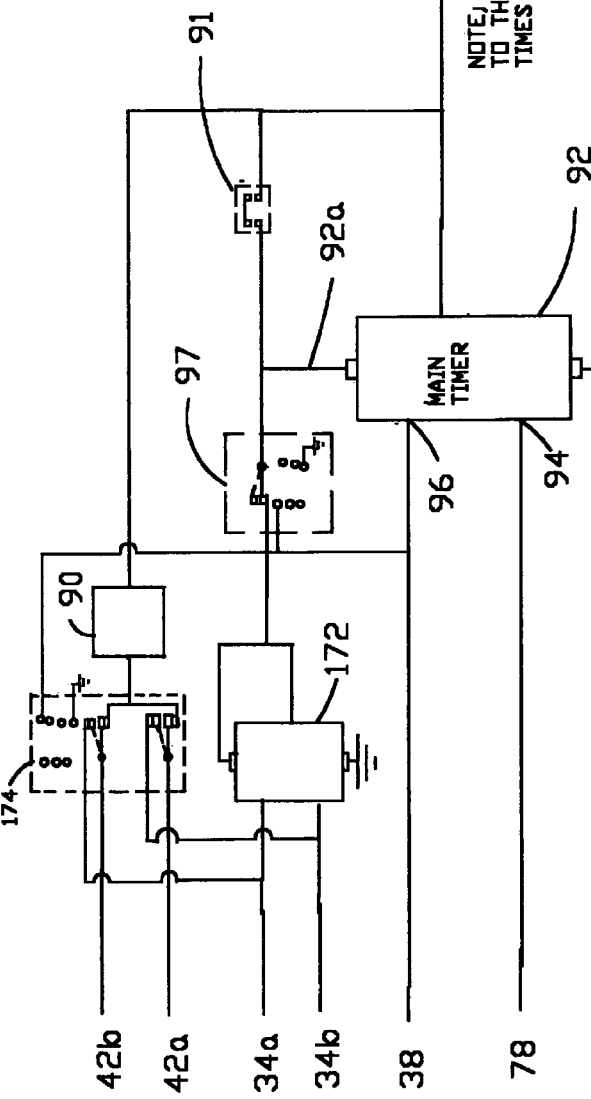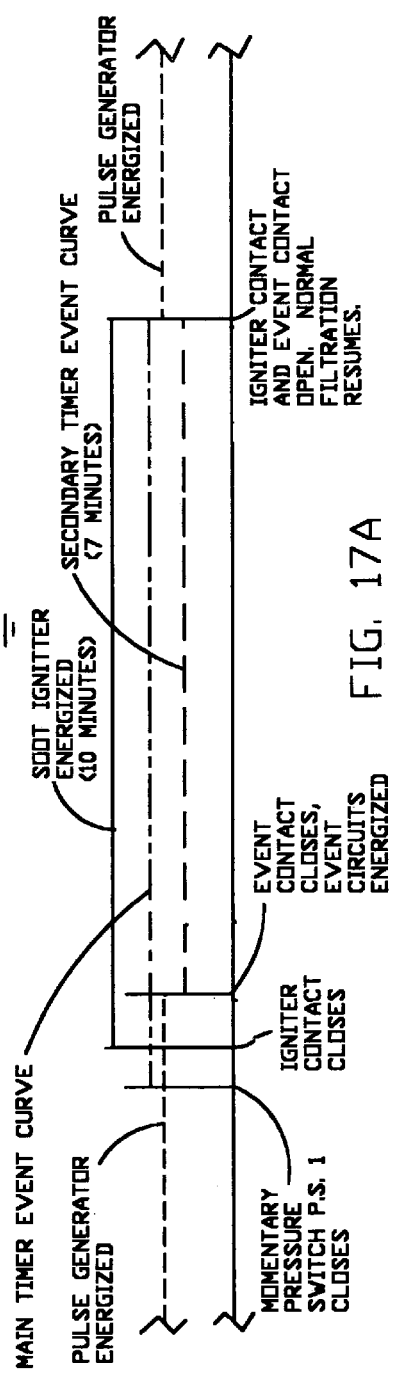
MULTI-TRAP PARTICULATE TRAP SYSTEM
(REGENERATION INITIATED BY TRAP PRESSURE DROP)
FIG. 17
FIG. 17A

DRY WEIGHT OF TRAPS AT VARIOUS STAGES OF REGENERATON TESTS (CORNING DURATRAP 200/12)

| STEPS | TRAP B WEIGHT | WT. CHG. |
|---|---|---|
| New trap | 1348.29 g | 0 |
| 1st. loading | 1357.57 g | 9.28 g |
| 1st. regeneration | 1355.33 g | 7.04 g |
| 2nd. loading | 1359.22 g | 10.93 g |
| 2nd. regeneration | 1357.36 g | 9.07 g |
| 3rd. loading | 1359.16 g | 10.87 g |
| 3rd. regeneration | 1357.08 g | 8.79 g |
| 4th. loading | 1359.39 g | 11.10 g |
| 4th. regeneration | 1356.56 g | 8.27 g |

FIG. 21

DRY WEIGHT OF TRAPS AT VARIOUS STAGES OF REGENERATON TESTS (CORNING DURATRAP 100/17)

| STEPS | TRAP C WEIGHT | WT. CHG. |
|---|---|---|
| New trap | 1165.5 g | 0 |
| 1st. loading | 1170.03 g | 4.53 g |
| 1st. regeneration | 1169.48 g | 3.98 g |
| 2nd. loading | 1170.90 g | 5.40 g |
| 2nd. regeneration | 1170.66 g | 5.16 g |
| 3rd. loading | 1172.17 g | 6.67 g |
| 3rd. regeneration | 1171.22 g | 5.72 g |
| 4th. loading | 1172.80 g | 7.30 g |
| 4th. regeneration | 1171.89 g | 6.39 g |
| 5th. loading | 1172.57 g | 7.07 g |
| 5th. regeneration | 1171.91 g | 6.41 g |

FIG. 23

PARTICULATE TRAP SYSTEM AND METHOD

CROSS-REFERENCE TO RELATED APPLICATIONS

This application claims the benefit of provisional patent application Ser. No. 60/734,164, filed 2005 Nov. 7 by the present inventor.

This application also claims the benefit of provisional patent application Ser. No. 60/763,409, filed 2006 Jan. 30 by the present inventor.

This application is a continuation-in-part of application Ser. No. 11/189,304 filed Jul. 26, 2005 now U.S. Pat. No. 7,273,514, which is a continuation of application Ser. No. 10/467,553 filed Aug. 1, 2003 now U.S. Pat. No. 6,989,045, and a continuation-in-part of application Ser. No. 10/846,780 filed May 14, 2004 now U.S. Pat. No. 7,269,942.

FEDERALLY SPONSORED RESEARCH

Not Applicable

SEQUENCE LISTING OR PROGRAM

Not Applicable

FIELD OF THE INVENTION

The present invention relates generally to methods and apparatus for removal of particulate from engine exhaust and more particularly to improved particulate filter systems, controls therefore, and a method of operating

BACKGROUND OF THE INVENTION

The Environmental Protection Agency (EPA) has issued increasingly stringent standards for particulate and NOx emissions. For example, the standards in place in October, 2002 include 0.1 g/hp-hr for particulates and 2.0 g/hp-hr for NOx. In 2007 these will be further reduced to 0.01 g/hp-hr for particulates and 0.2 g/hp-hr for NOx. Industry has intensive programs aimed at achieving these requirements.

U.S. patent application Ser. No. 10/846,780, now U.S. Pat. No. 7,269,942, discloses a method and apparatus for filtering or trapping particulate from engine exhaust and periodically disposing of the collected soot and ash. The system uses a monolithic ceramic trap having passages with porous walls through which the exhaust is passed to filter out the particulates at very high (90-97%) trapping efficiency. The systems use wall-flow traps in single or multi-trap configurations. Each of these systems can be used with any diesel engine and is capable of achieving the EPA particulate standards for the foreseeable future. Engine manufacturers can concentrate on achieving the very challenging NOx standards without concern for particulate emissions control. The particulate trap system can also be used for retrofit applications.

The wall-flow particulate trap systems use cordierite traps, such as Corning EX-80 or RC-200, to filter the exhaust gas by passing it through the porous walls of trap channels. This action removes 90-98% of the particulate and this collects on the inside surfaces of the passages as a layer or cake which after a few hours of operation increases the engine backpressure and must be removed to prevent adverse affect on engine performance. Most prior art trap systems remove this layer by burning the particulate or soot in the trap. To avoid excessive temperatures during this operation, expensive noble metal catalytic coatings are required and ultra low sulfur fuel must be used which will not be broadly available for a number of years. Also, the engines must be operated at a relatively high average load factor to assure that burn-out occurs before too much soot is collected. To assure that light-off temperatures are reached heaters such as burners or late injection coupled with catalysts are increasingly employed. Finally, the incombustible ash builds up and the traps and must then be cleaned in an expensive and disruptive maintenance operation. It is desirable to overcome one or more of these problems.

OBJECTS AND ADVANTAGES

Accordingly, objects of the present invention include one or more of the following:

1. Provide apparatus for using an instantaneously applied reverse pressure drop pulse of previously filtered exhaust gas for effective dislodging and removal of the soot/ash cake in a single trap or multi-trap particulate trap systems.

2. Provide apparatus for utilization of very high reverse pressure drops such as those used with diesel engine exhaust brakes (25-60 psig) without loss of component life or reliability.

3. Provide apparatus and controls for a single trap system in which a duct/rotor is stationary when the relatively high reverse pressure drop occurs and the pressure induced force of the duct/rotor against the trap face is high; and in which the duct/rotor is rotated when there is substantially zero reverse pressure and thus no pressure induced forces to assure negligible wear of the rotor and trap faces.

4. Provide apparatus and controls for a single trap systems in which the reverse pressure is provided by actuating a relief valve, a duct/rotor aligns with a group of contaminated passages; and in which the substantially constant pressure reverse pressure is almost instantly applied by a small two-position mode valve as one or more pulses which will more effectively dislodge the soot cake than steady state reverse flow pressure drop.

5. Provide for regeneration of a multi-trap particulate trap system in which the system used for single trap system is duplicated to provide filtration capacity for larger vehicle and industrial engines. The regeneration may be carried out simultaneously in each of the traps to reduce the time the increased reverse pressure must be maintained in order to minimize any adverse affect on engine efficiency and power output. The actual reverse flow pulses may sequentially occur in the group of traps to provide a relatively constant purge flow rate to the separation chamber to enhance separation and combustion of the soot particles.

6. Provide control systems for carrying out regeneration that are simple and inexpensive and which are independent of the engine or its controls.

7. Provide control systems which in whole, or in part, obtain the reverse pressure across the porous walls of the trap from the high backpressure utilized in diesel exhaust brake systems and using a commercially available exhaust brake installed downstream of the particulate trap.

8. Provide control systems which in whole, or in part, obtain the reverse pressure across the porous walls of the trap from the backpressure that results when a relief valve is actuated downstream from the trap when the engine is operating at low idle.

SUMMARY OF THE INVENTION

In accordance with the present invention there is provided a particulate trap system for an exhaust system of an internal combustion engine and including a monolithic wall-flow particulate trap having a plurality of contiguous porous walls, a remotely actuated relief valve downstream of said trap for periodically creating a reverse pressure throughout the exhaust system upstream of the relief valve and including said trap, a reversing apparatus for periodically creating a reverse pressure drop across a portion of the contiguous porous walls of said trap to dislodge accumulated particulate and cause a portion of the filtered exhaust gas to flow back through said portion of the contiguous porous walls to remove particulate therefrom, and controls for actuating the relief valve and the reversing apparatus.

The reversing apparatus includes an indexing mechanism upstream of said trap to periodically change the said portion of the porous walls receiving the back flow of filtered exhaust gas so that the entire trap is systematically cleaned.

Advantageously, wall-flow single trap and multi-trap technology is used to reduce particulate emissions. The particulate trap system can be located almost anywhere in the exhaust system and is substantially independent of the engine and its controls.

In accordance with another aspect of the present invention there is provided a method of regenerating a wall-flow particulate trap having a plurality of contiguous porous walls for filtering particulate from an exhaust system of an internal combustion engine, the method including the steps of: creating a backpressure in the entire exhaust system from a location downstream of the trap; creating a reverse pressure drop across only a portion of the porous walls to dislodge accumulated particulate therefrom; and causing a portion of filtered exhaust gas to flow back through said portion of the porous walls to carry the dislodged particulate out of the trap.

Other aspects of the present invention include alternative regeneration strategies and associated control systems to effectively dislodge and remove the soot/ash deposits from the passages of single trap and multi-trap particulate trap systems during regeneration. The improvements relate to the manner in which the components operate and/or interact with each other. In addition, some of the improvements interact with, or provide, diesel exhaust brakes that are increasingly popular for larger vehicles such as trucks and motor homes. These alternative strategies assure effective regeneration and improved durability and reliability of the particulate trap systems and are adaptable to a broad range of industrial engines and vehicles such as automobiles, trucks, and buses.

The particulate trap systems avoid the necessity of using high pressure air, used by some companies, by using a reverse flow of filtered exhaust gas to create a pulse-induced reverse pressure drop across the trap of sufficient magnitude and duration to dislodge and erode the accumulated soot and ash cake and to transport the dislodged particles to an external chamber for suitable disposal. When the reverse pressure is permitted to exist across only a smaller number of the passages at a given time, only these passages will have their soot dislodged and removed and the resultant reverse flow rate at a given time will be much less.

These and other objects and advantages will become apparent as the same become better understood from the following detailed description when taken in conjunction with the drawings.

BRIEF DESCRIPTION OF THE DRAWINGS

FIG. 2A is a cross-section taken generally along line A-A of FIG. 1 or FIG. 2.

FIG. 7A is a cross-section taken generally along line B-B of FIG. 7.

FIG. 7B is a sectional view taken along line C-C of FIG. 7A.

FIG. 8A is a cross-section taken generally along line D-D of FIG. 8.

FIG. 8B is a sectional view taken along line E-E of FIG. 6A.

FIG. 12 is a schematic drawing illustrating a control used with a single particulate trap system in which regeneration occurs after reaching a designated trap pressure drop.

FIG. 12A is a diagrammatic view showing significant events that occur during operation of the particulate trap system controlled by the FIG. 12 control.

FIG. 13 is a schematic drawing illustrating a control used with a single particulate trap system in which regeneration begins after reaching a designated trap pressure drop and is effected by the increased pressure resulting from closing the relief valve during diesel engine operation at low idle.

FIG. 13A is a diagrammatic view showing significant events that occur during operation of the particulate trap system that regenerates during engine low idle operation and is controlled by the FIG. 13 control.

FIG. 14 is a schematic drawing illustrating a control used with a single particulate trap system in which regeneration begins after reaching a designated trap pressure drop and is effected by the increased pressure at the trap exit during diesel exhaust brake application.

FIG. 14A is a diagrammatic view showing significant events that occur during operation of the particulate trap system having a diesel exhaust brake and controlled by the FIG. 14 control.

FIG. 16A is a diagrammatic view showing significant events that occur during operation of the particulate trap system controlled by the FIG. 16 control.

FIG. 17 is a schematic drawing illustrating a control used with the multi-trap system in which regeneration occurs after reaching a designated trap pressure drop.

FIG. 17A is a diagrammatic view shows significant events that occur during operation of the particulate trap system controlled by the FIG. 17 control.

FIG. 21 is a table showing the 35 psi regeneration test data.

FIG. 23 is a table showing the 20 psi regeneration test data.

DETAILED DESCRIPTION OF THE INVENTION

In this Description all values are approximate and the values may vary as a result of product configuration, usage, and requirements.

Figure 1:
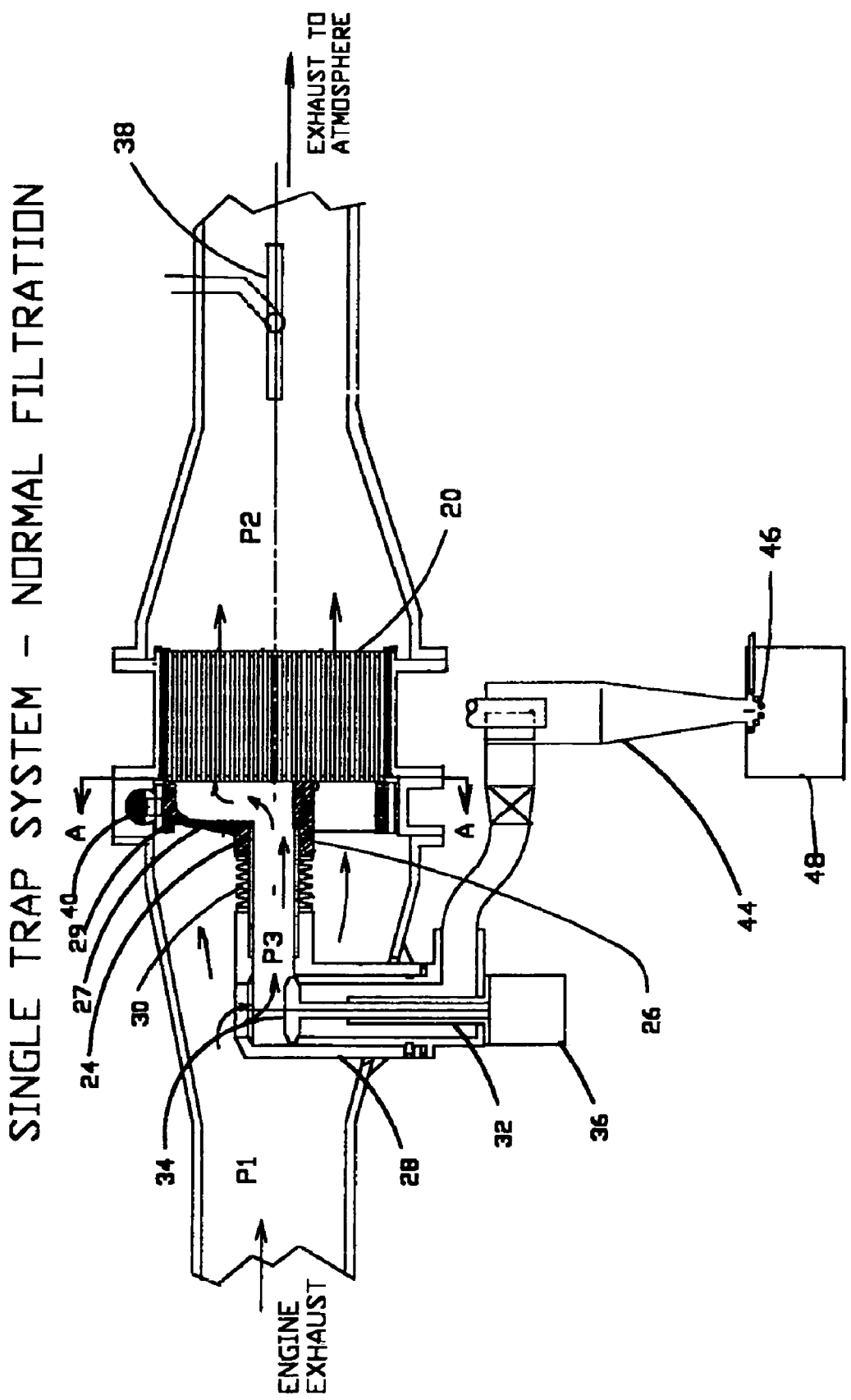
FIG. 1 illustrates a wall-flow single trap according to U.S. patent application Ser. No. 10/846,780, now U.S. Pat. No. 7,269,942, during normal filtration.
Figure 2:
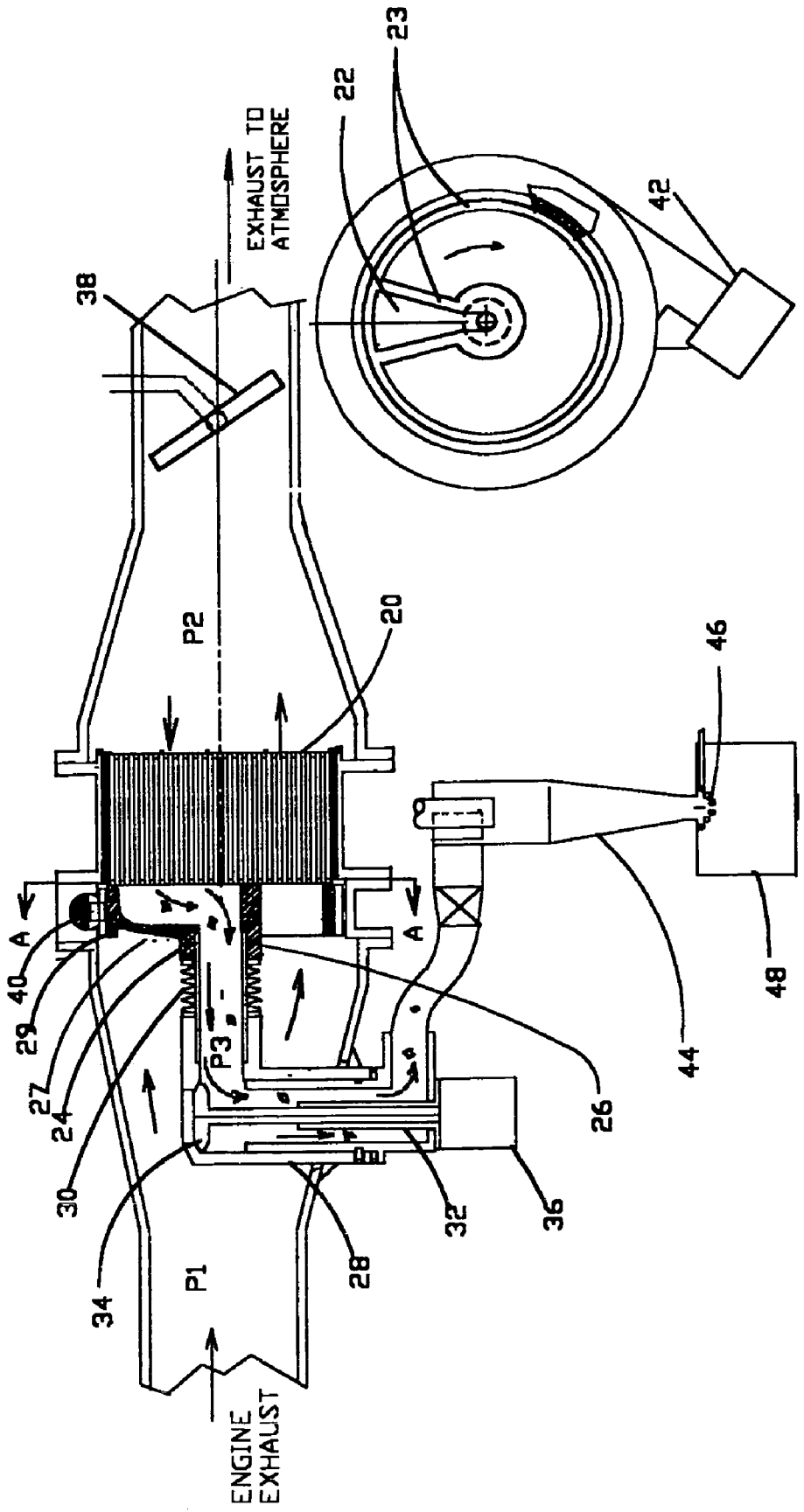
FIG. 2 shows the FIG. 1 configuration during regeneration.

FIGS. 1 and 2 show the salient features of a particulate trap system with which various improvements are utilized. The principal parts are a monolithic wall-flow trap 20, a duct rotor 24, a duct rotor ratchet actuator 40, a mode valve assembly 32, a remotely actuated relief valve 38, and a cyclone separator 44, with its attached igniter 46 and ash storage chamber 48. The mode valve assembly 32 includes a purge duct 28, a two-position valve 34, and a mode valve actuator 36. The duct rotor 24 includes a duct section 27 and a ring gear 29, and is mounted loosely on a pilot bearing 26 which keeps the duct rotor centered. The duct rotor 24 is pressed against the face of the trap 20 by a spring/seal 30, with just enough force to preclude the duct rotor from moving off the face of the trap due to inertia or gas loading. The contact between the duct rotor and the trap is shown by footprint 23, indicated in FIG. 2A. The footprint 23, results in a reverse flow duct section 22, and a continuous ring of contact between the duct rotor and the trap. The enclosed area of the reverse flow duct section 22, of the duct rotor/trap footprint is only about 4-6% of the total area of the trap entrance face. The faces of the duct rotor 24, and the trap 20, that contact each other are ground very flat and smooth to permit relative movement with negligible wear.

In normal filtration operation, shown in FIG. 1, the remote actuated relief valve 38, is wide open and pressure P2 is substantially ambient. Engine exhaust enters the large majority of the trap passages and, because the mode valve 36 is not energized, exhaust flows past the mode valve 34 and enters the reverse flow duct section 22.

As shown in FIG. 2, when the trap is loaded (i.e. has a particulate cake) and regeneration is desired, the igniter coil 46 is energized. After a brief period for the igniter coil to reach a desired temperature, the remote actuated relief valve 38 is actuated and pressure P2 is raised to a substantially constant pressure sufficient to dislodge the particulate cake. Then the mode valve actuator 36, is energized to move the mode valve 34 to the position shown. This prevents further exhaust flow into the reverse flow duct and, at the same time, opens the reverse flow duct 22, to ambient pressure. This action results in a reverse pressure drop across the porous walls throughout the length of the smaller number of trap passages encompassed by the reverse flow duct 22, and results in the soot/ash cake being dislodged from the entire inner surface of the affected passages and transported to the cyclone separator 44, which removes the soot from the purge flow to be ignited and burned by the igniter coil 46. The incombustible ash is collected in the ash storage chamber 48 for periodic disposal. Because in this earlier version the duct rotor is substantially continuously rotating, the reverse flow duct section 22, of the rotor will move to provide reverse pressure drop across additional passages and, at the same time, return cleaned passages to normal filter operation.

Figure 3:
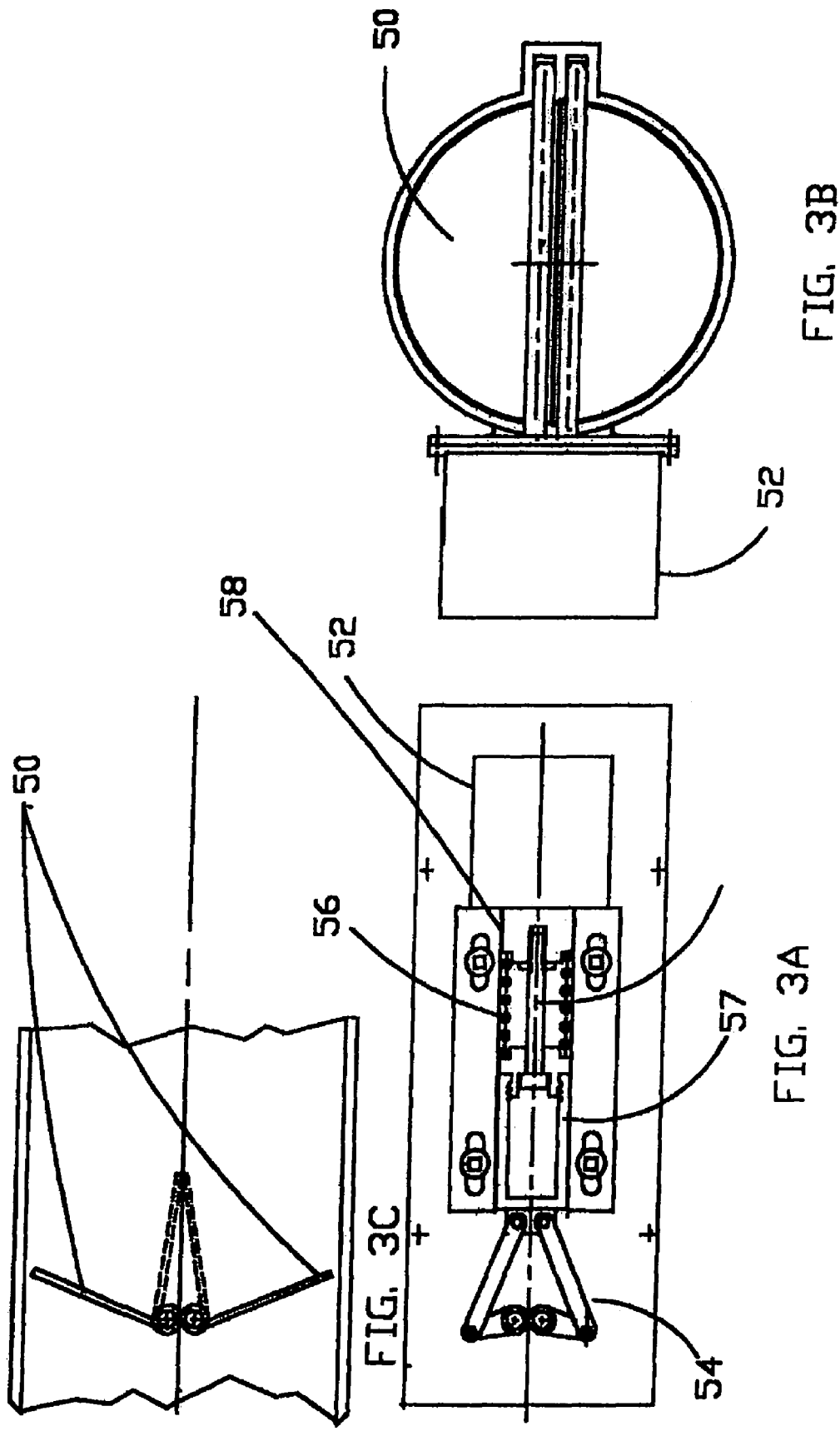
FIGS. 3A-C illustrate a remotely actuated relief valve for use with any of the particulate trap systems.

FIG. 3 illustrates an electromechanical remotely actuated relief valve which includes two hemispherical butterfly valves 50 that are closed in response to an electrical input to an actuator 52. Upon closing, the pressure immediately builds up and impose a force against the butterfly valves 50. When the pressure reaches the desired level, the force will act through linkages 54, and overcome a low rate spring 56 that is pre-loaded between slip link 57 and an actuator plunger 58. The butterfly valves will open as required to maintain the desired pressure regardless of the engine speed and load. A relief valve of this type can be used in the various particulate trap systems.

Figure 4:
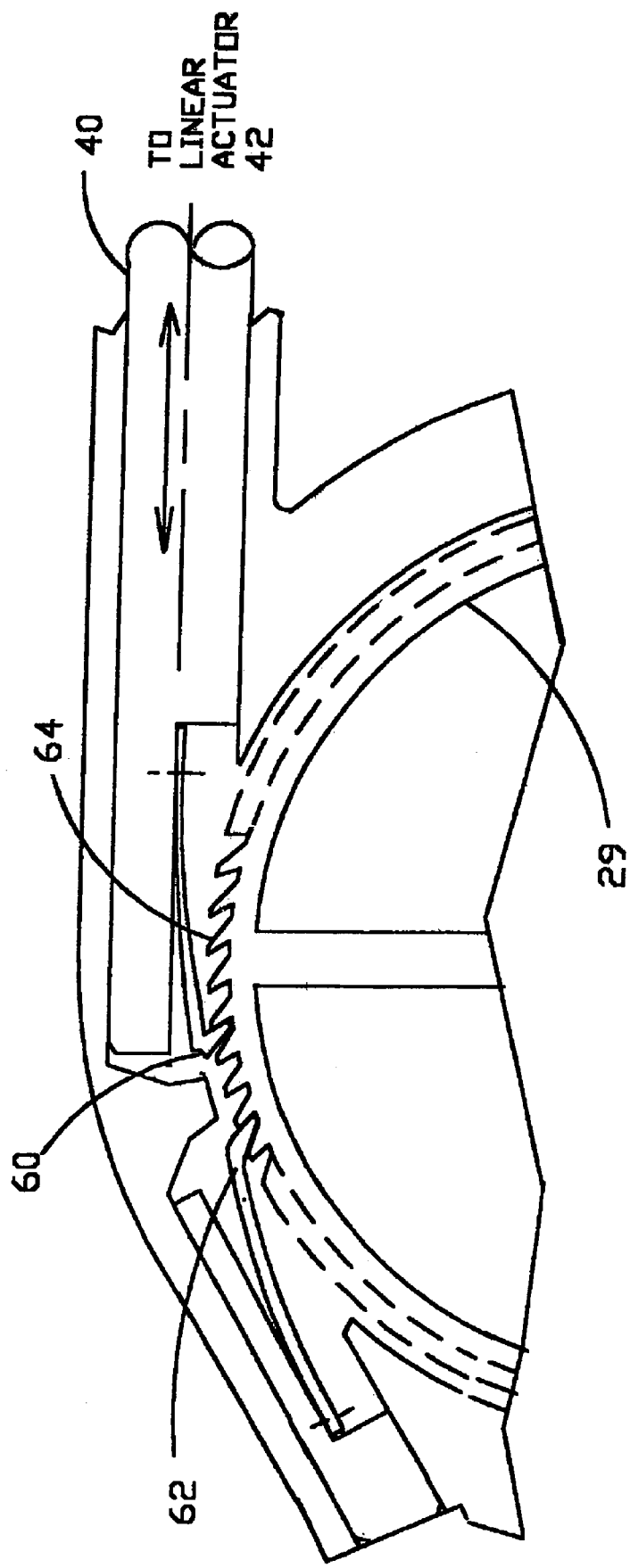
FIG. 4 illustrates a ratchet drive for rotating the duct rotor.

FIG. 4 illustrates a ratchet drive having springs 60, 62 with integral pawls that engage teeth 64 in ring gear 29, and are used for actuation. The springs are made from a material that will retain its mechanical properties under all anticipated temperatures that the trap system will encounter. Use of a ratchet mechanism of this type for the rotor drive has important advantages such as freedom for the duct rotor to expand and contract due to changes in exhaust temperature without affecting the ratchet action. An important advantage is that the ratchet actuation is effected by digital pulses of electricity. Consequently, the duct rotor rotation can occur or be stopped at will. In addition, the digital nature of the ratchet actuation simplifies the control device that is used to provide the desired regeneration strategy. Also, no changes need to be made to the ratchet actuation device for various single and multi-trap particulate trap configurations.

Figure 5:
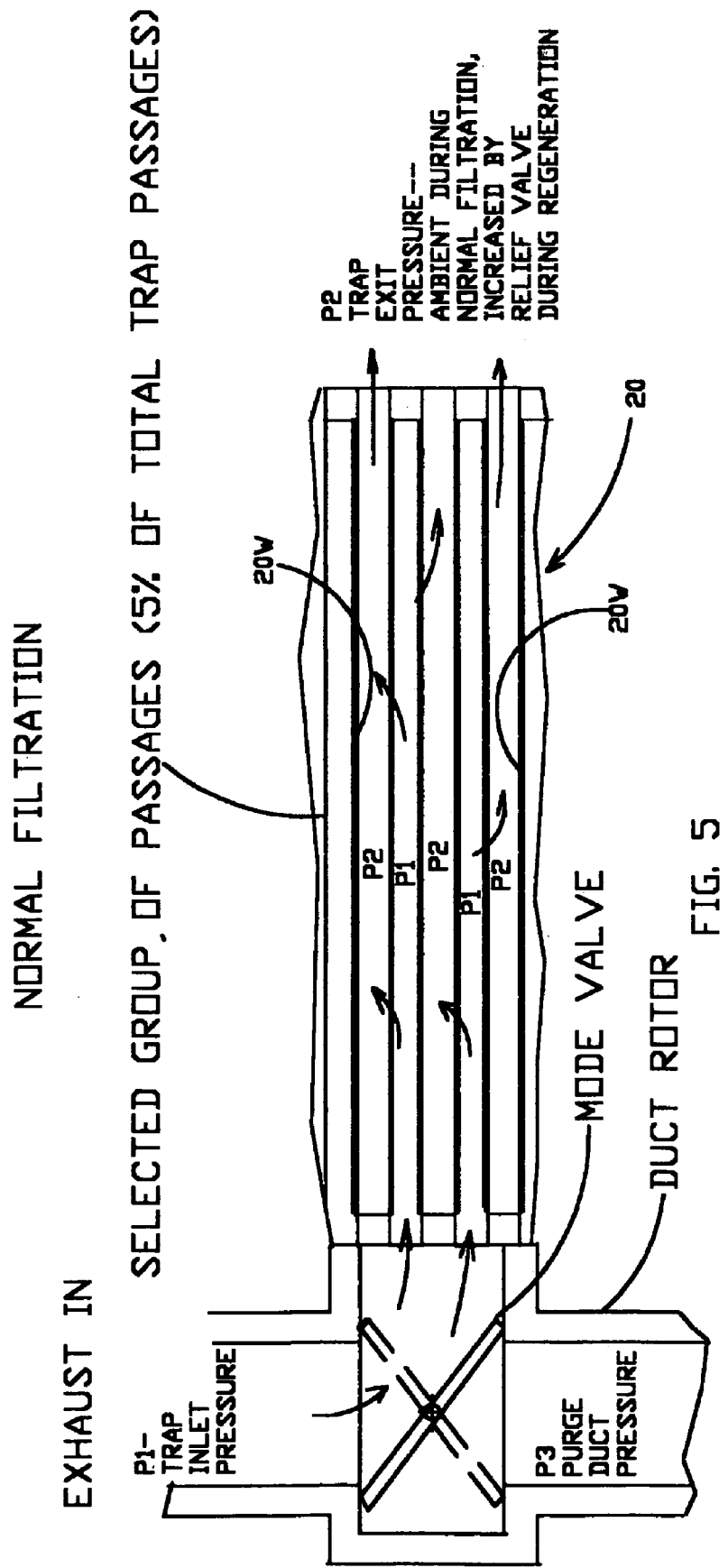
FIG. 5 is a diagrammatic view illustrating an apparatus embodying the present invention during normal filtration.

FIG. 5 schematically illustrates the particulate trap regeneration principle during normal filtration. The monolithic wall-flow particulate trap 20 has a plurality of porous walls 20W which are contiguous to each other. It will be noted that of the trap passages (a portion of which is shown enlarged in FIG. 5), only about five percent are regenerated at a given time and exhaust gas continues to pass through the remaining ninety five percent of the trap passages where it is filtered and continues to pass through the remote actuated relief valve (not shown in this view). Because the three-way mode valve is in the position shown, five percent of the exhaust gas enters the selected passages in which it is filtered and then mixes with the exhaust passing through the relief valve. During normal filtration, the remote actuated relief valve is open and P2 is at ambient pressure. During normal filtration, the duct rotor is moved to select a new group of passages to prevent it from becoming stuck by particulate. However, the events continue as described above.

When regeneration is initiated, the pressure at the trap exit is increased by actuating a relief valve 38 or 76 set, for example, at 35 psig. This will raise the pressure in the entire exhaust system upstream of the relief valve, including in all of the passages in the trap 20 including the selected group. However, with the mode valve 32 closed as shown, the flow continues as before through the selected passages. The pressures in the passages have been labeled P1 for the inlet passages and P2 for the exit passages of the group. During this period the pressures P1 and P2 are nearly equal. This is Phase 1 of the regeneration process as will be discussed more fully later.

Figure 6:
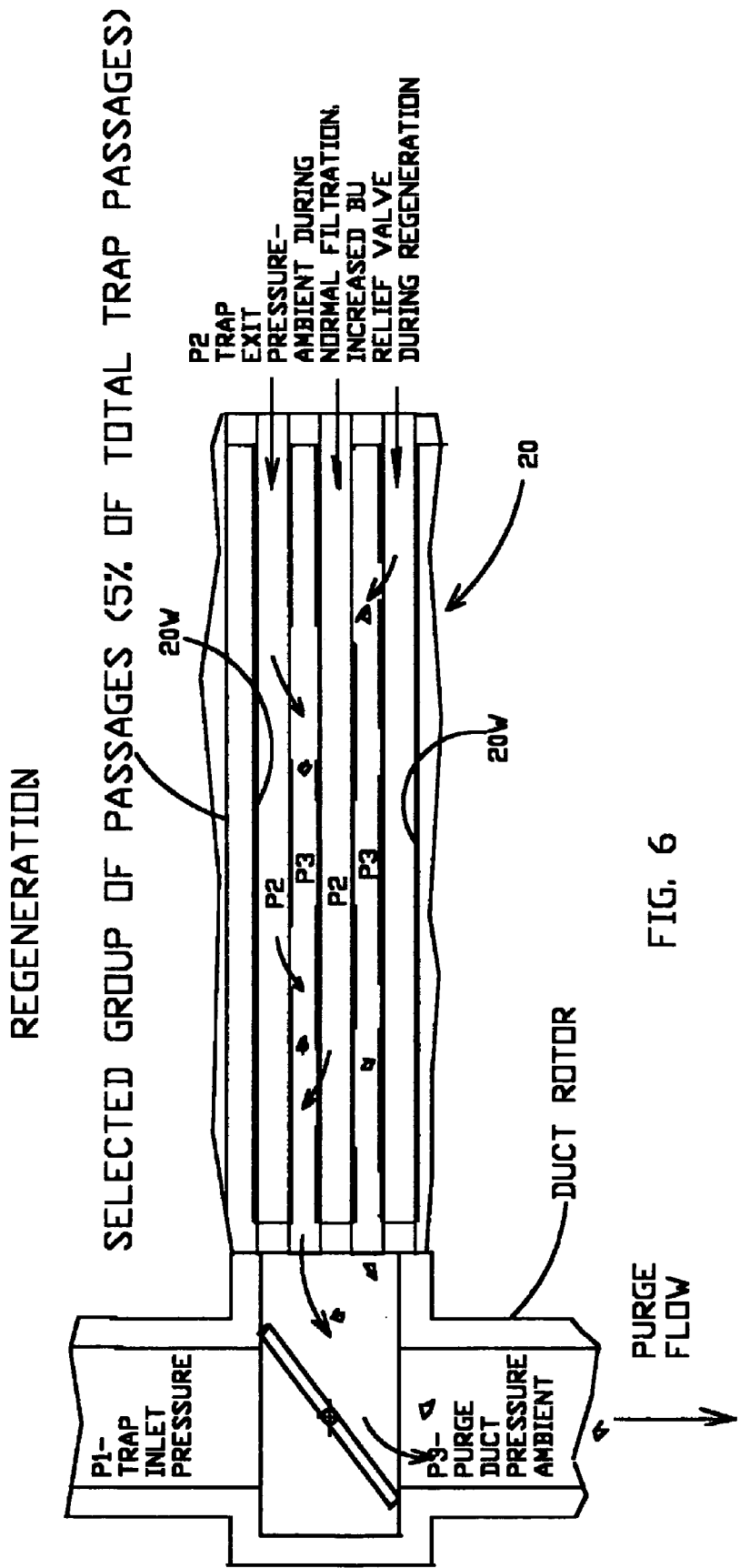
FIG. 6 illustrates FIG. 5 apparatus in a regeneration position.

FIG. 6 shows the particulate trap principle during Phase 2 of the regeneration process. The mode valve has been changed to the open position, thus connecting the inlet passages to the purge duct which is at ambient pressure and, by the same action, precluding exhaust from entering the inlet passages. Therefore, the pressure in all of the inlet passages in the selected group shown as P3 almost instantly drops to ambient. It is theorized that a depression wave occurs in the inlet passages of the selected group. However, the pressure in all of the exit passages shown as P2 remains at the high 35 psig pressure. Thus, almost instantly a reverse pressure of 35 psi is imposed across the porous walls of the selected group of passages. This reverse pressure dislodges the particulate cake from the inlet passage walls and the resultant flow carries these particles out through the purge duct. The way the Phases of this process are carried out and controlled will become more clear later in the Specification. As used herein the term "dislodge" is intended to mean any sudden removal of or breaking away of the cake and/or an erosion thereof.

Figure 7:
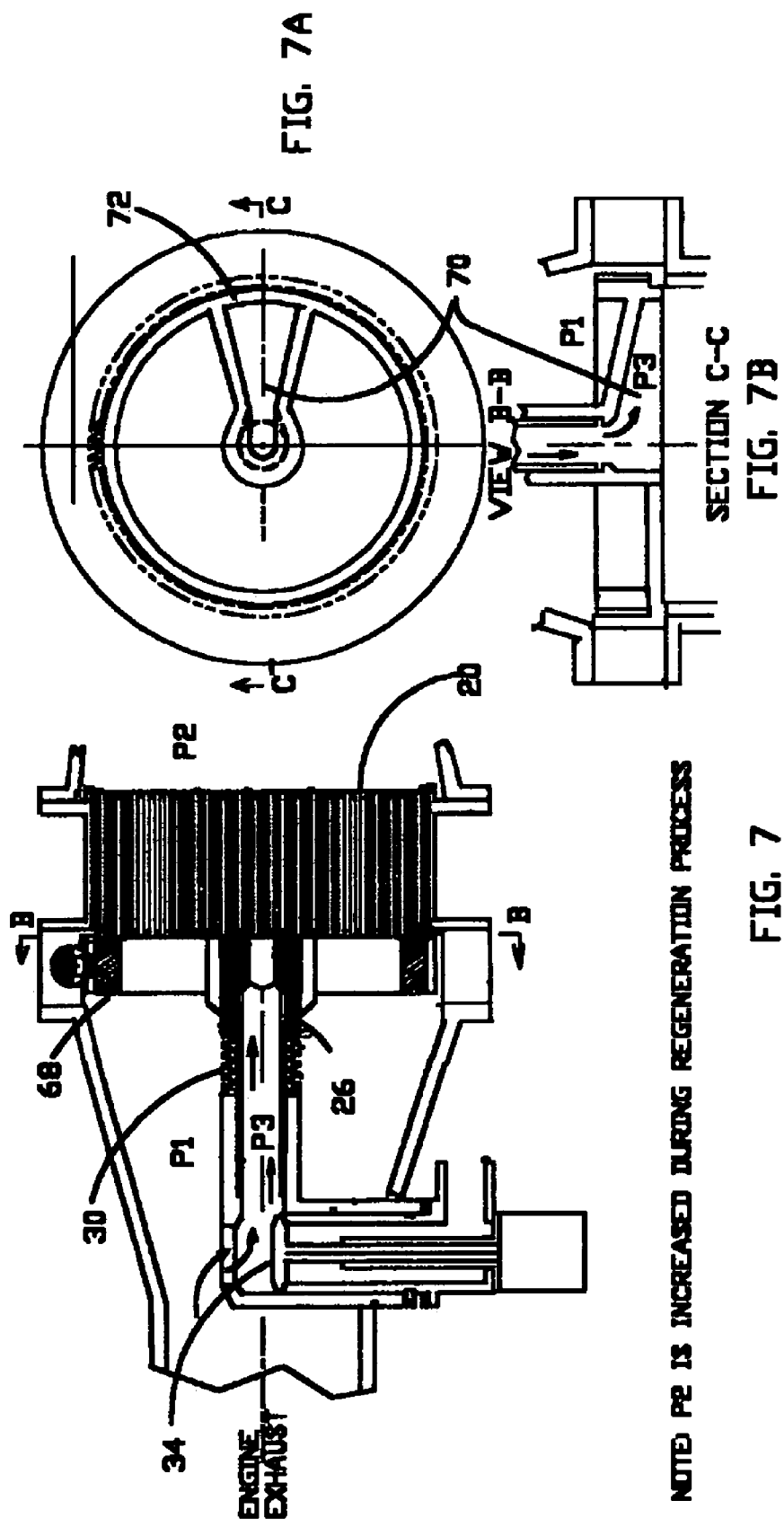
FIG. 7 shows a portion of the FIG. 1 apparatus in phase 1 of a regeneration process.

FIG. 7 shows more detail of phase 1 of the regeneration process during normal filtration. The FIG. 5 design is somewhat different from the FIG. 1 design and different reference numerals have been provided for similar parts. As can be seen by the arrows, most of the exhaust from the engine passes directly through the trap to be filtered. However, because the mode valve 34 is closed, about 5% of the exhaust enters the purge duct and enters a small group of trap passages from the reverse flow duct 70. This exhaust is also filtered and then joins the majority of the filtered exhaust gas and then passes through the remote actuated relief valve (shown at 38 in FIG. 1) and thence to the atmosphere. It will be noted that with the mode valve 34 closed, as shown, pressure P1 will equal pressure P3 in a reverse flow duct 70. Therefore, during normal filtration no pressure difference exists across the walls of the reverse flow duct 70, and there is no pressure induced force tending to push the duct rotor against the trap. The only force of the rotor against the trap face is the light spring/seal 30 which is used as a seal and to keep duct rotor in contact with the trap face.

Figure 8:
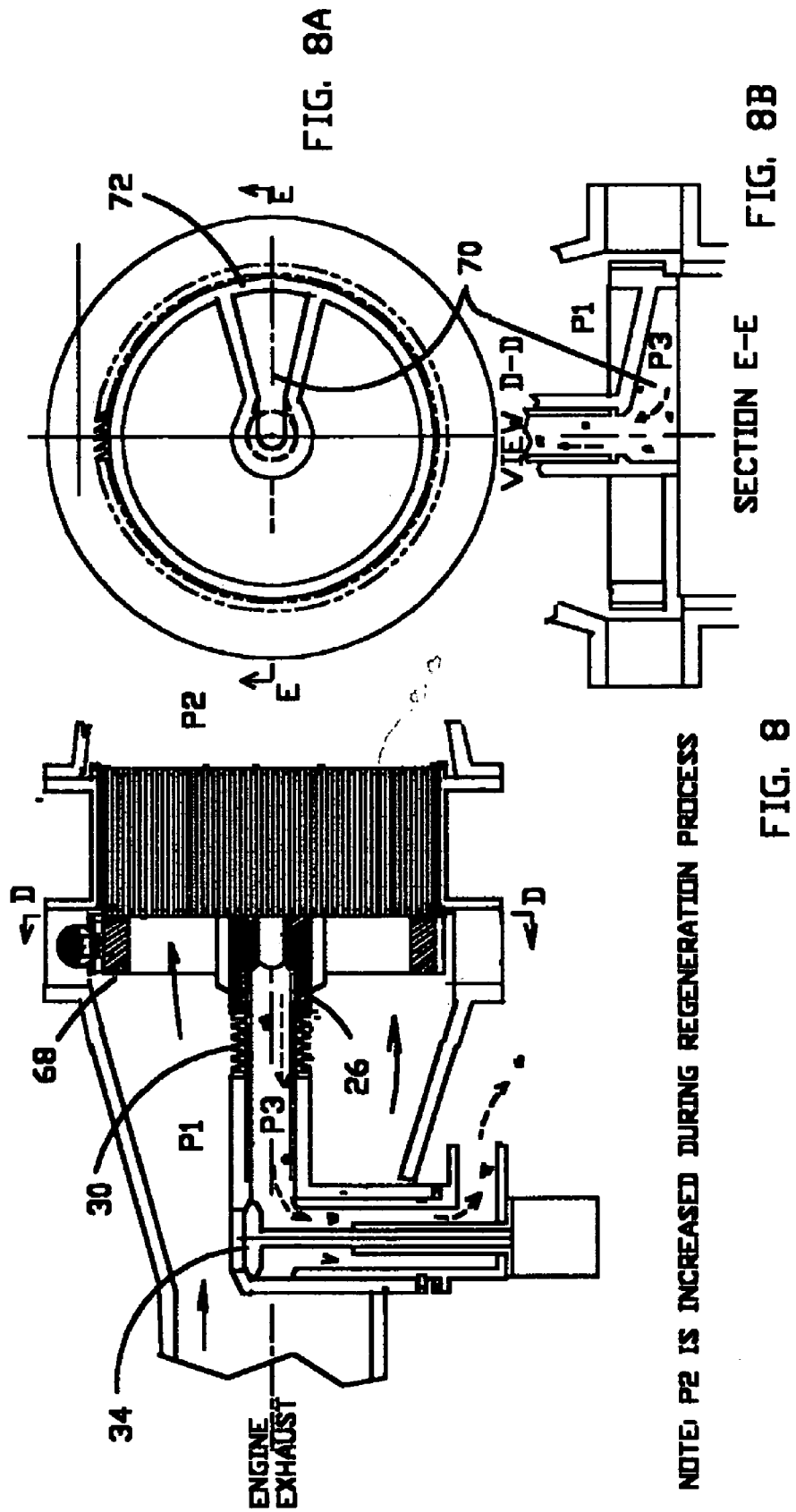
FIG. 8 is a view similar to FIG. 7 but illustrating phase 2 of the regeneration process.

FIG. 8 shows more detail of phase 2 of the regeneration process during the regeneration step. As can be seen, the mode valve 34, has been actuated upwardly and is seated in the upper position. This prevents the flow of exhaust into the reverse flow duct 70. At the same instant, the mode valve 34 opens the reverse flow duct 70 to ambient pressure. This causes the pressure in the reverse flow duct to also drop to ambient. This drop in pressure results in a depression wave passing through the contaminated passages causing an almost instantaneous pressure drop across the porous trap passage walls as a pulse. This sharp application of the pulse is effective in dislodging the particulate cake. Also, this drop in pressure P3 in the reverse flow duct 70 causes a pressure difference between P1 and P3. If the relief valve (e.g. 38 in FIG. 1) is set at a high pressure, there will be a similarly high force created by the pressure differential between P1 and P3 acting across the area encompassed by the reverse flow duct. Although the area encompassed by the reverse flow duct 70 is only about 5% of the trap face area, this force will be about 200 pounds if the relief valve is set at 35 psig in a 12" diameter trap. Consequently, it is desirable to have the duct rotor 68 remain stationary while the regeneration step is carried out. It should be noted that the force of the rotor against the trap face is countered by the force in the opposite direction that results from the pressure drop across the passages being cleaned. Therefore, there is no force trying to move the trap 20. In view of the above, the control will cause the ratchet 42 to stop and hold the duct rotor 68 stationary during the very brief period of the regeneration pulse.

When the phase 2 regeneration step ends, the mode valve 34 again closes, returning the regeneration process to phase 1. This, as noted in connection with FIG. 5, causes the pressure P3 in the reverse flow duct 70 to equal the pressure P1 at the trap entrance. This removes all pressure induced force pushing the duct rotor 68 against the face of trap 20, leaving only the light force of spring seal 30. At this time, a control (hereafter described in detail) causes the ratchet 42 to rotate the duct rotor 68 to the next group of contaminated passages.

Figure 9:
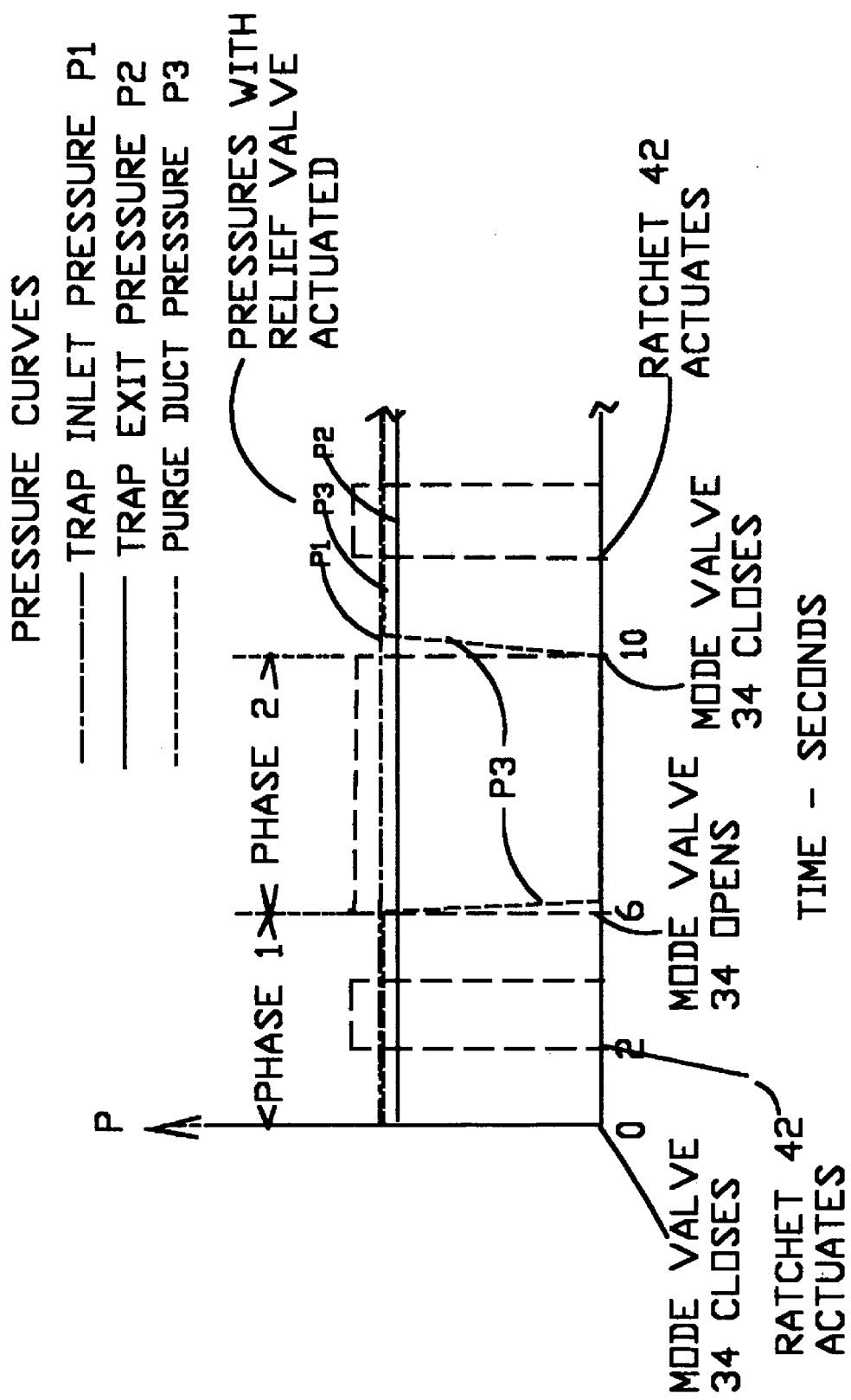
FIG. 9 is a graph of pressure vs. time events which take place during phases 1 and 2 of the regeneration process.

FIG. 9 shows the pressure vs. time curves for each of the above discussed phases of the regeneration process. It will be noted that the sequencing of actuation of mode valve 34 and movement of ratchet 42 to rotate the duct rotor 68, is carried out by a simple secondary timer (hereinafter described) which rotates at a constant speed of about 1 revolution per each 10 seconds. Since there are about 40 groups of contaminated passages to be cleaned and only one group is cleaned per revolution of the secondary timer, the entire trap will be cleaned in 400 seconds or about 7 minutes. Other embodiments can be cleaned even faster, even under 2 minutes. Secondary timers of this general type are usable in all trap systems described herein.

Figure 10:
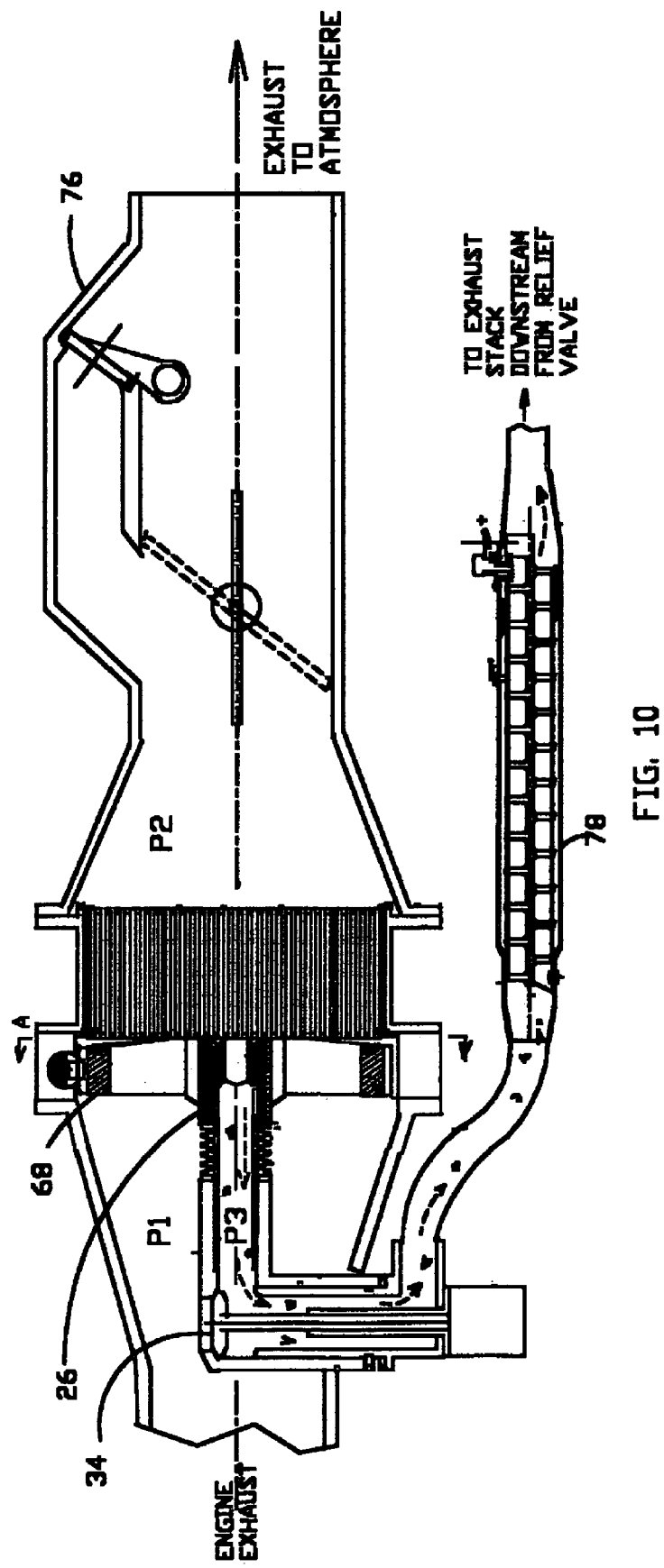
FIG. 10 is a longitudinal sectional view showing a particulate trap system utilizing a D-Celerator® diesel exhaust brake valve for the remotely actuated relief valve and a spiral burner.

FIG. 10 shows the particulate trap system from FIG. 6 to which a D-Celerator® diesel exhaust brake 76 marketed by United States Gear Corp. has been installed for use as the remote actuated relief valve 34. This exhaust brake 76 is electrically actuated and is available in various sizes. It has been developed to provide pressures from 23 to 60 psi for diesel engine braking. However, when regeneration is carried out in concert with exhaust braking, the use of 35 psig is preferred because the published literature states that this lower pressure is safe for all diesel engines without modification. This pressure exceeds the reverse pressure required for regeneration under all conditions that might be expected in service. As has been discussed, the system can operate with these high reverse pressure drops while maintaining negligible wear of the rotor 68 and trap 20 against which it is engaged. However, unless used as an exhaust brake in the various embodiments, the D-Celerator® is adjusted to provide only enough pressure to assure adequate regeneration.

Also shown in FIG. 10 is a spiral burner 78 which is considered a preferred embodiment for separating and burning the soot. Because the average flow rate of the purge flow is quite small, the entire purge flow with its entrained soot particles can be passed through the spiral burner 78. The spiral burner has a very high temperature nickel/chrome igniter element wound around its periphery. The soot particles are moved outwardly by centrifugal force as they spin through the spiral burner and are ignited and burned on contact. The incombustible ash is so minute for each regeneration that it is believed the ash can simply be carried out with the exhaust without adverse effects to the environment.

For ease of understanding, the following control systems are described using electro-mechanical components. While these will perform satisfactorily, it should be understood that many or all of the control components may be computerized and/or executed using solid state technology.

Figure 11:
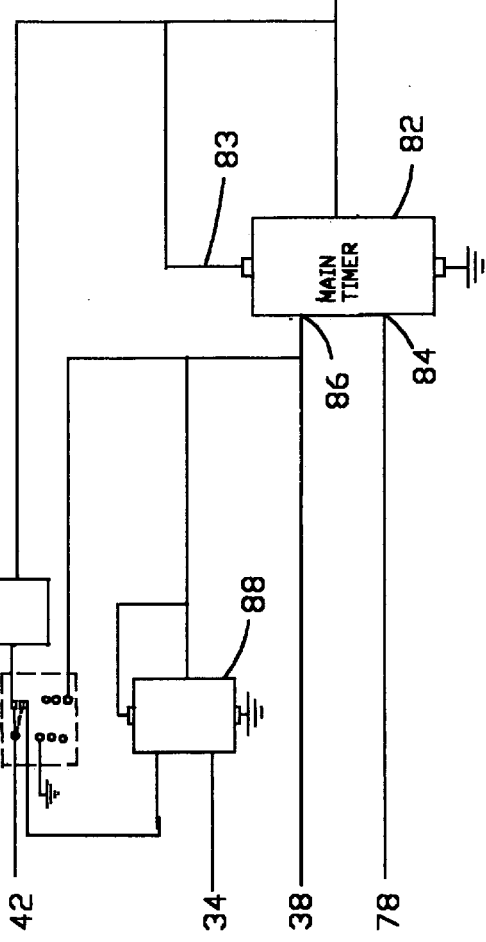
FIG. 11 is a schematic drawing illustrating a control used with a single particulate trap system for regeneration after an elapsed time period.
Figure 11A:
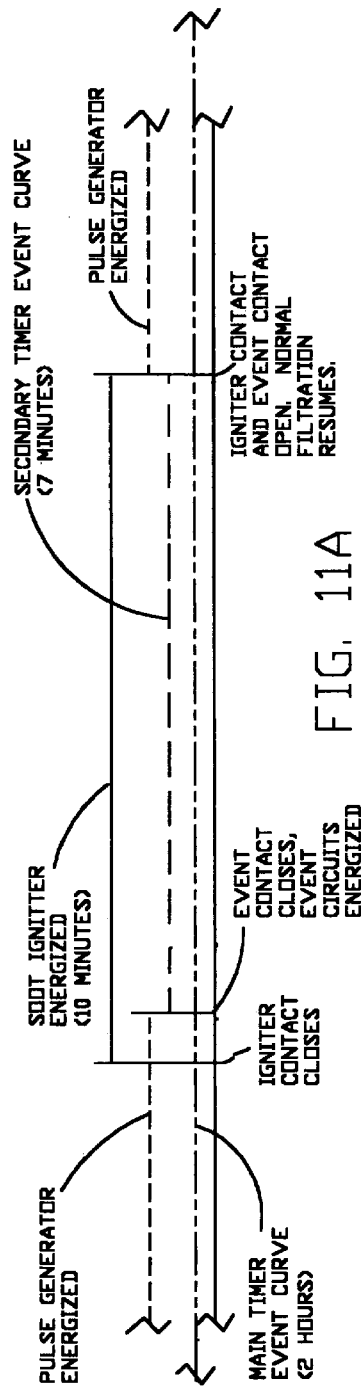
FIG. 11A is a diagrammatic view showing significant events that occur during operation of the particulate trap system controlled by the FIG. 11 control.

FIGS. 11 and 11A illustrate a control system used for the single trap particulate trap system in which regeneration is initiated after a fixed time of engine operation. The fixed time period is selected to assure that the trap will not exceed a safe loading of six grams per liter. However, it should be long enough for a reasonable particulate cake to accumulate in the passages of the trap 20. The cake provides more effective filtering and is amenable to dislodging during regeneration. In periods of normal operation when the particulate trap is filtering the exhaust, electrical power enters the control and passes through a circuit leading to a pulse generator 80. Between regeneration periods a single pole double throw (SPDT) relay 81 is closed and the pulse generator 80 sends pulses of electricity every few minutes to the duct rotor ratchet drive actuator 42. When the relay 81 is in this position, the pulse generator is disconnected from the secondary timer 88 to isolate the secondary timer 88 and its circuitry from the periodic pulses of electrical energy. The action of the pulse generator keeps the duct rotor from becoming stuck due to particulate deposits. In addition, power is constantly supplied via line 83 to a main timer 82 which runs all of the time that the engine is in operation. After the engine has operated for say, two hours, the igniter contact 84 closes and energizes the igniter element of spiral burner 78. After about three minutes to allow the igniter element to reach its maximum temperature, the event circuit contact 86 is closed and the event circuits energized. Closing the event contact 86 causes SPDT relay 81 to open. This stops the pulse generator 80 from periodically rotating the duct rotor 68 and, at the same time, connects the secondary timer 88 to the duct rotor ratchet actuator 42. Closing of the event contact 86 also closes the remote actuated relief valve 38 and increases the pressure of the filtered exhaust gas at the exit of trap 20 to a level that assures reliable regeneration. Finally, closure of the event contact 86 starts rotation of the secondary timer 88. As noted in connection with FIG. 7, rotation of the secondary timer causes the ratchet actuator 42 to rotate the duct rotor 68 (phase 1) and causes mode valve 34 to alternately open and close to dislodge the particulate (phase 2). As the secondary timer 88 continues to run, this alternate action occurs until all of the groups of passages in trap 20 have been cleaned. This will require about seven minutes. As noted earlier, the main timer 82 runs continuously during engine operation. Consequently, after about 10 minutes to assure all of the passage groups have been cleaned, the main timer 82 opens both the igniter contact 84 and the event contact 86. At this time, the remote actuated relief valve 38, secondary timer 88, and igniter in spiral burner 78 are turned off. In addition, the relay 81 is turned off and its contacts closed to again return the pulse generator 80 to its task of periodically rotating the duct rotor 68. The particulate trap system is thus returned to normal filtration operation for another two hours.

FIGS. 12 and 12A illustrate a control for the single trap particulate trap system in which regeneration is initiated after the trap pressure drop has reached a pre-selected value. As in FIG. 11, the power is directed to the control all of the time that the engine is operating. During normal filtering operation, power is supplied to a pulse generator 90, then through a normally closed SPDT relay switch 99, to the ratchet 42. When the relay 99 is in this position, the pulse generator 90 is disconnected from the secondary timer 98 to isolate the secondary timer 98 and its circuitry from the periodic pulses of energy. Power is also supplied to a switch 91 which is a time delay momentary pressure switch that closes when the trap pressure drop reaches a designated sustained level, e.g. 40 in. W.G., for a pre-selected interval longer than the normal engine exhaust pulse interval. When this occurs, power is supplied to a drive line 92a of a main timer 92 which begins to move. After the main timer 92 moves enough, an igniter contact 94 closes and energizes the igniter element of spiral burner 78. After another few minutes, an event contact 96 closes and energizes the event circuits. First, relay switch 97 is energized and closed thereby supplying power to the main timer 92 regardless of the condition of momentary switch 91 and the main timer continues to run until regeneration is complete. Also, SPDT relay switch 99 is energized and opened, thereby stopping the periodic actuation of the ratchet 42 at the trap and, at the same time, connects the secondary timer 98 to the duct rotor ratchet actuator 42. Current is also sent to the remote actuated relief valve 38 which is closed. Finally, power is sent to a secondary timer 98 which provides the power alternately to ratchet 42 and mode valve 34, thus carrying out the phase 1 and phase 2 steps as discussed in connection with FIG. 7. Following completion of regeneration of all of the groups of passages, the main timer 92 will have turned enough to open both the igniter contact 94 and the event contact 96. Because all the associated circuits are now turned off, the components all return to their normal filtration positions and the trap 20 returns to the normal filtration operation until the pressure drop across the trap again actuates the time delay momentary switch 91.

FIGS. 13 and 13A illustrate a control for a single trap particulate in which regeneration is carried out when the remote actuated relief valve is actuated while the engine is operating at low idle. It has been stated by U.S. Gear that the pressure upstream of their exhaust valve (remote actuated relief valve) under these conditions is 22 psig and can be maintained without causing engine stalling. In this configuration regeneration is initiated after reaching a designated trap pressure drop. During normal filtration operation power is supplied to the pulse generator 108, then through a normally closed SPDT relay switch 110, to the ratchet 42. When relay 110 is in this position, the pulse generator is disconnected from the secondary timer 118 to isolate the secondary timer and its circuitry from periodic pulses of electrical energy. Also power is supplied to a time-delay momentary pressure switch 104, which closes after the trap inlet pressure reaches a sustained 40 in. W.G., to signal that the trap is loaded and the regeneration period should begin.

When the particulate trap pressure drop during normal filtration operation has reached 40 in. W.G., time-delay momentary pressure switch 104 closes and power is sent to a single pole double throw (SPDT) switch 120 which is spring loaded to the right in the drawing. This directs power to the main timer drive 112a, causing main 112 to begin operating. After the main timer 112 has operated for a brief period, igniter contact 114 closes and the igniter element in the spiral burner 78 is energized. Following sufficient time for the element to reach its maximum temperature, event circuit contact 116 closes and energizes the event circuit. This action moves the SPDT relay 110 which opens and temporarily keeps the pulse generator 108 from rotating the duct rotor 24 and, at the same time, connects the secondary timer 118 to duct rotor ratchet drive 42. If the engine is operating at any normal speed above low idle speed, the engine tachometer will not send a signal to pole single throw (SPST) 125 and it will be spring loaded to its open position. Under these conditions no electrical energy is sent to the remote actuated relief valve 38 and it will remain in its open position and the pressure at the trap exit will be ambient. Thus, momentary pressure switch 122 will also remain open. Under these conditions there will be no electrical energy transmitted to the drive circuit 112a of the main timer 112 and the drive circuit 118a of the secondary timer 118. The system will then remain poised until the driver takes his foot off of the accelerator and the engine speed drops to low idle.

When the driver closes the throttle and slows the engine to about 100 rpm above low idle, the engine tachometer will send an electrical signal to close relay 125. This will close the remote actuated relief valve 38, which will increase the pressure at the trap exit 122 which will, in turn, energize the drives for timer 112 and 118a and the regeneration process will begin. When the operator again accelerates the engine the increases the engine speed, relay 125 will open removing electrical energy from the relief valve which will open, the regeneration process will stop, the system will return to normal filtration and the control will remain poised.

The above actions continue until all of the trap passages have been cleaned and the main timer 112 has rotated enough to open contacts 116 and 114 which deenergize the event circuit and igniter circuits, respectively. The particulate control will return to normal filtration until trap pressure drop increases enough to activate time-delay momentary switch 104.

FIGS. 14 and 14A illustrate a control for the single trap particulate system in which the regeneration is carried out in concert with diesel exhaust braking. In this configuration regeneration is initiated after reaching a designated trap pressure drop. During normal filtration operation power is supplied to the pulse generator 108, then through a normally closed SPDT relay switch 110, to the ratchet 42. When relay 110 is in this position, the pulse generator is disconnected from the secondary timer 118 to isolate the secondary timer and its circuitry from periodic pulses of electrical energy. Also power is supplied to a time-delay momentary pressure switch 104, which closes after the trap inlet pressure reaches a sustained 40 in. W.G., to signal that the trap is loaded and the regeneration process should begin. Because the exhaust brake will apply a much higher pressure to the exhaust many times during normal filtration operation, normally-closed relay 106 opens by application of the brake control to prevent false signals of trap loading from being sent to the time delay momentary pressure switch 104.

When the particulate trap pressure drop during normal filtration operation has reached 40 in. W.G., time-delay momentary pressure switch 104 closes and power is sent to a single pole double throw (SPDT) switch 120 which is spring loaded to the right in the drawing. This directs power to the main timer drive 112a, causing main timer 112 to begin operating. After the main timer 112 has operated for a brief period, igniter contact 114 closes and the igniter element in the spiral burner 78 is energized. Following sufficient time for the element to reach its maximum temperature, event circuit contact 116 closes and energizes the event circuit. This action moves the SPDT relay switch 120 to the left in the drawing, disconnecting all power to the main timer 112 which temporarily stops. The event circuit also sends a signal to the SPDT relay 110 which opens and temporarily keeps the pulse generator 108 from rotating the duct rotor 24 and, at the same time, connects the secondary timer 118 to duct rotor ratchet drive 42. Energizing the event circuit also sends a signal to activate the exhaust brake control system which de-activates the cruise control and locks out the overdrive. In the FIG. 8 example, it also places the exhaust brake in the "D-Feat" mode of the United States Gear D-Celerator® system. In this mode, the exhaust brake 76 is applied whenever the driver lifts his foot from the accelerator, and the brake is released whenever the driver again presses the accelerator. Energizing the event circuit also stops the main timer 112 which remains poised. Advantageously, this action also turns on a cab signal that notifies the driver that the regeneration period is in progress.

When the driver's foot is removed from the accelerator to cause the exhaust brake 76 to be applied, a signal is sent to exhaust brake 38 causing it to close. When the brake pressure builds up to about 20 psig, the momentary pressure switch 122 closes. Because the event circuit is energized, this action then starts the main timer 112 and, also starts the secondary timer 118 via line 118a to cause the trap system to alternate between phase 1 and phase 2 as described in regard to FIG. 7. When the brake is released, the pressure at the momentary pressure switch 122 drops and thus opens switch 122 and again the system stops and remains poised. After a cumulative time of brake applications, the secondary timer 118 will have rotated the duct rotor 24 far enough to have cleaned all of the groups of passages. During this period, the main timer 112 and the secondary timer 118 rotate at their respective speeds. Thus after the trap has been cleaned, the igniter contact 114 and the event contact 116 open and all components will return to normal filtration mode. There may be some concern that the driver of a line haul truck operating on an interstate highway may not lift his foot to decelerate often enough once the regeneration process is initiated to prevent the trap from becoming overloaded. The optional safety timer 123 and associated relays 126 and 128 is identified to begin to run for about one hour. If the trap is not cleaned and the event circuit deenergized within fifty minutes, the timer 123 will close relay 128 and provide a signal or apply the exhaust brake.

It should be noted that when the particulate trap system is integrated with an exhaust brake the increased engine backpressure required for regeneration occurs only during vehicle deceleration or idle operation. Consequently, the regeneration process has substantially no adverse affect on engine fuel consumption or the means used to control NOx or other gaseous emissions.

Figure 15:
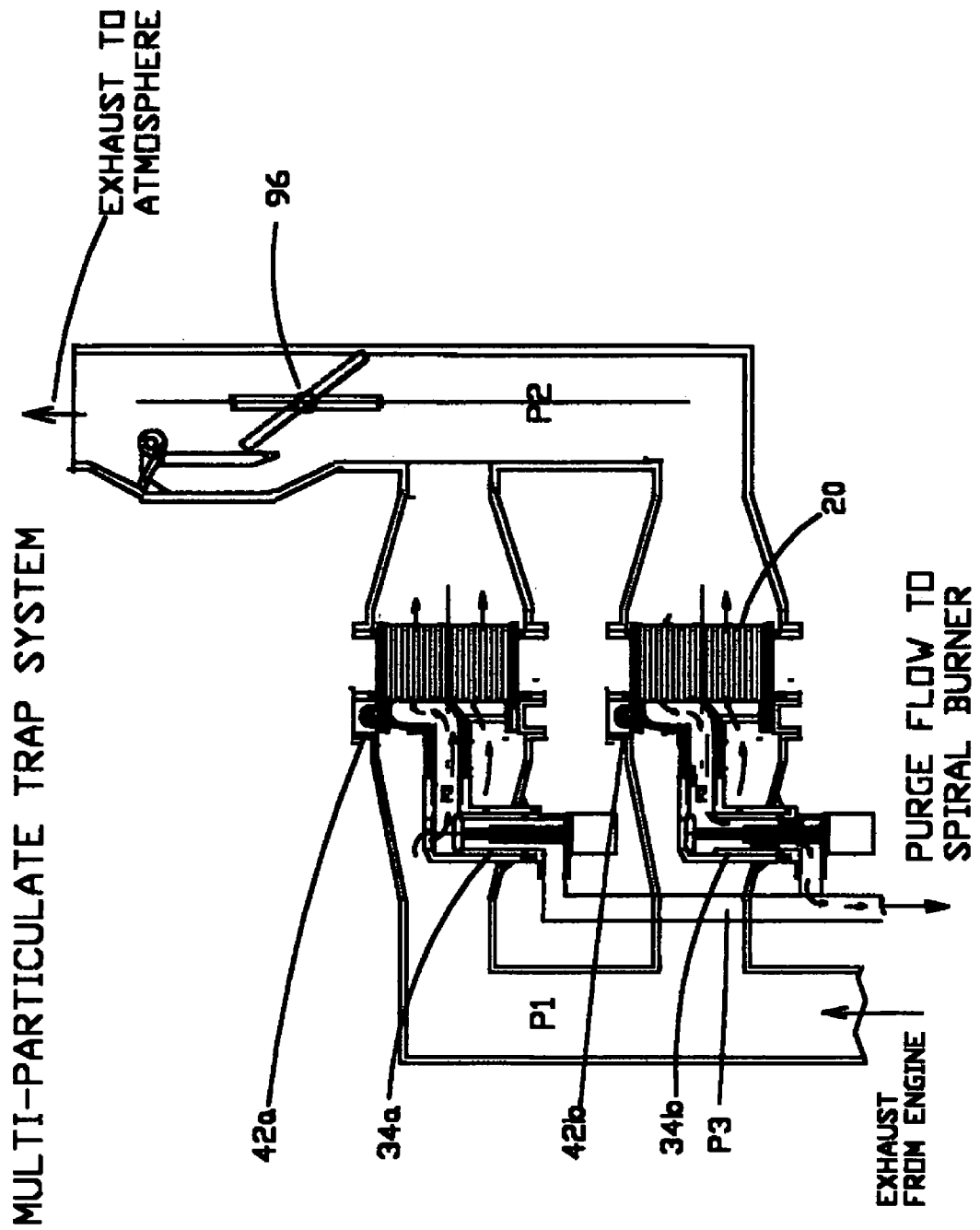
FIG. 15 is a sectional view illustrating a multi-trap particulate trap system used for larger engines in which the single trap system is substantially duplicated.

FIG. 15 illustrates an approach to provide greater particulate trap capacity with large industrial engines in various applications. As shown, the single trap system is duplicated to provide a two trap system. Advantageously, the particulate trap systems are identical to those used in single trap applications and appropriately sized. These are ducted together using one remote actuated relief valve 96, and one purge duct leading to a spiral burner, along with a suitably modified control. Although the preferred remote actuated relief valve 96, is shown as a United States Gear Corp. D-Celerator®, it would be adjusted to provide just enough pressure to assure complete regeneration of the trap passages. It is assumed that few, if any, of the larger engines would use diesel exhaust brakes. It will apparent to those skilled in the art, that any of the single trap configurations that were discussed earlier can be executed as multi-trap configurations by use of the minor changes discussed in conjunction with FIGS. 16 & 17.

Figure 16:
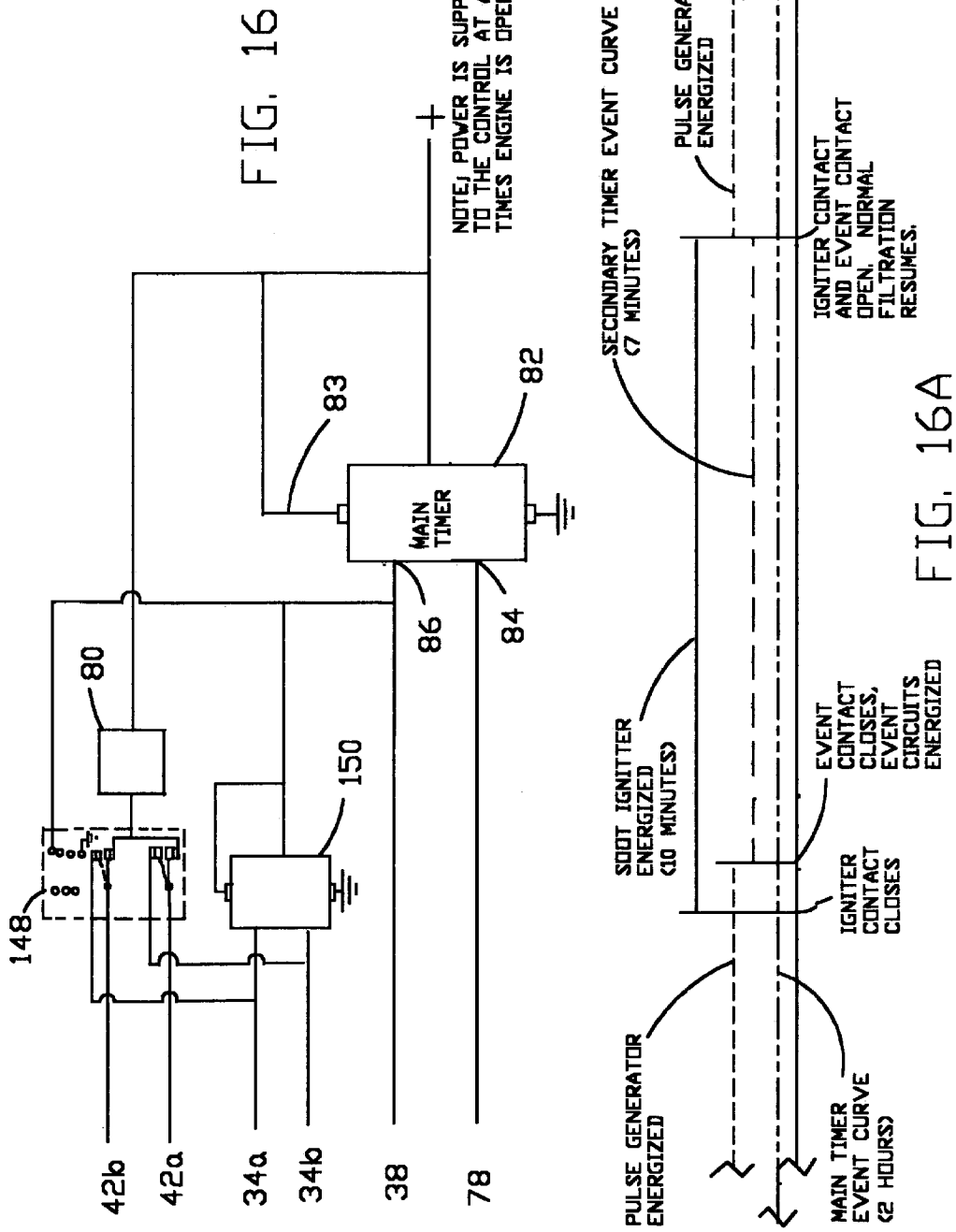
FIG. 16 is a schematic drawing illustrating a control used with a multi-trap system that is regenerated after an elapsed time period.

FIGS. 16 and 16A illustrate the control for a multi-trap configuration in which regeneration is initiated every two hours. This control is similar to the control shown and described in FIGS. 9 and 9A. The same parts contain the same reference numerals as FIGS. 11 and 11A. The changes relate to SPDT relay 148, and an arrangement for connecting the mode valves 34a and 34b, and ratchets 42a and 42b to the secondary timer 150. The relay 148 contains a pole for each trap and the poles are operated together. There is little difference in the secondary timer 150 in this system. However, with multiple traps it is important that only one mode valve 34 is opened at any one time and that they be opened in sequence for the traps. Similarly, the ratchet 42 is also actuated for only one trap at a time but 180 degrees out of phase with the mode valves. This results in a steadier purge flow to and through the spiral burner.

FIGS. 17 and 17A illustrate a control for a multi-trap configuration in which regeneration is initiated by reaching a pre-selected pressure drop across the traps. This control is similar to the control shown and described in FIGS. 12 and 12A for a single trap and the same parts contain the same reference numerals as in said FIGS. Again, the only difference between the multi-trap and single trap control is the SPDT relay 174 having a pole for each trap used and the connection of the secondary timer 172 to mode valves 34a and 34b and to ratchets 42a and 42b. Consequently, no further description is considered necessary.

Figure 18:
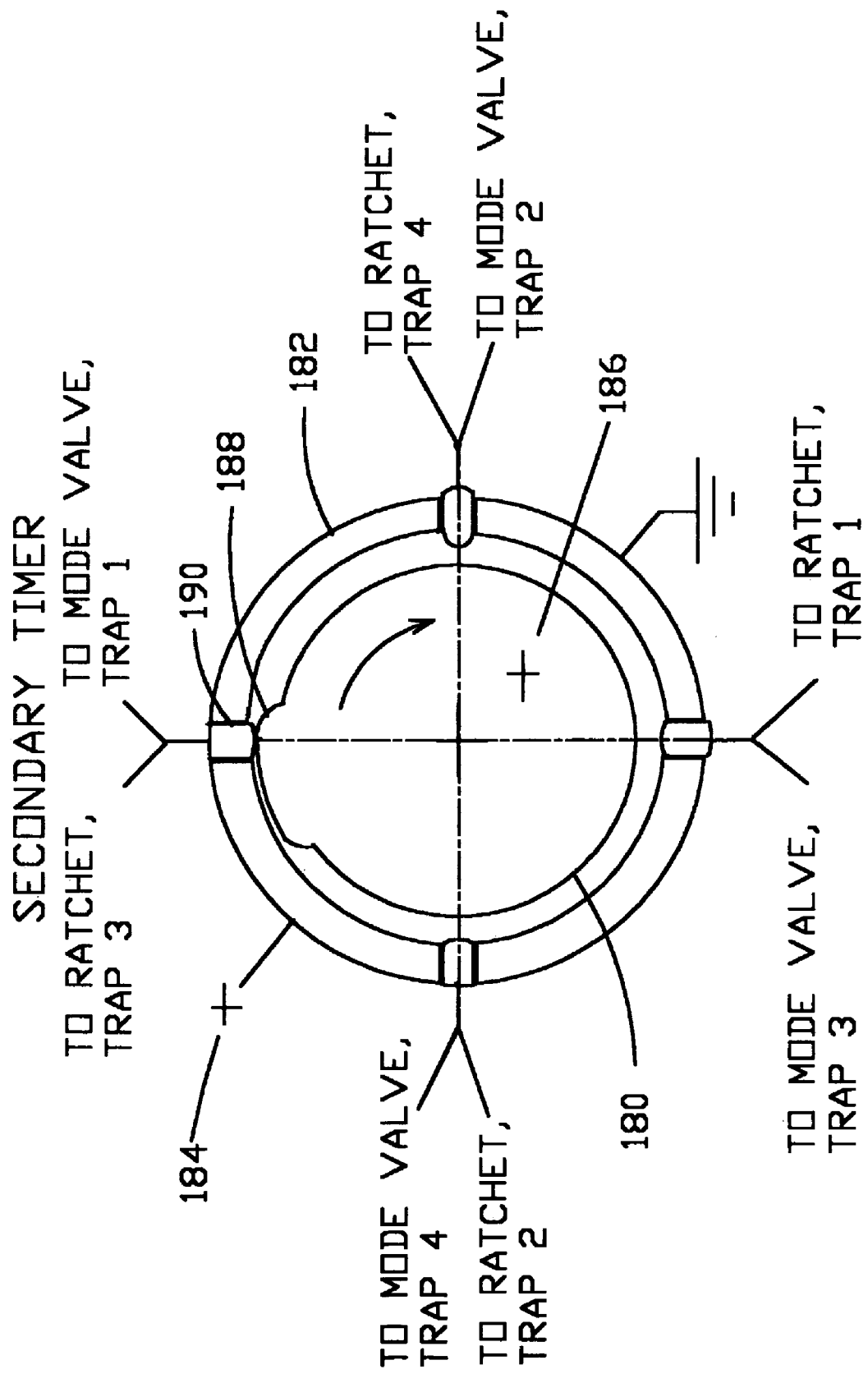
FIG. 18 is a cross-section of a secondary timer usable with any of the above single trap or multi-trap systems.

FIG. 18 illustrates a cross section of secondary timer 88, 98, 118, 150 or 172 that can be used with any of the particulate trap systems. The secondary timer consists of a rotor 180 which is insulated from the rotor drive motor (not shown) and the housing 182. The rotor can be rotated by energizing drive line 184, as directed by the control. During the regeneration period the rotor 180 is electrically charged by line 186, and a slip ring (not shown). The rotor 180 contains an integral contact lobe 188 that periodically briefly engages a brush or other electrical contact 190 which is also insulated from the housing 182. Electrical lines are run from the contacts 190 to the trap mode valves and ratchet actuators described above. When the regeneration process begins, the rotor drive 184 is energized and the rotor begins to rotate at about six revolutions per minute. As the timer lobe 188 engages one of the electrical contacts 190, a trap mode valve or trap ratchet will be actuated in the case of a single particulate trap system. This action will alternate between ratchet actuation (phase 1) and mode valve actuation (phase 2) during each half revolution of the rotor 180. In the case of a multi-particulate trap system, as in the four trap system illustrated, each engagement of the trap contact lobe 188, with an electrical contact 190, will actuate both a mode valve for one trap and, at the same instant, a ratchet for another trap.

In the case of a particulate trap system in which no exhaust brake is employed, the regeneration process once dictated by the control will continue without interruption until the entire trap has been cleaned. However, in the case of a particulate trap system in which the exhaust brake pressure plays a role, the regeneration process will be interrupted each time the exhaust brake is turned off. This action will stop the rotation of the rotor 180. When the exhaust brake is again applied, the rotor will again begin to rotate. To prevent extraneous mode valve and ratchet movements, the rotor is constantly energized. If the contact lobe 188, is in contact with an electrical contact 190, when the rotor stops, the mode valve or ratchet will simply remain in the actuated position until once again the rotor begins to rotate.

With a single particulate trap system, only two electrical contacts would be used, with the mode valve contact and the ratchet contact placed at opposite sides of the timer housing 181. The timer rotation would then provide the alternate action required for phase 1 and phase 2 of the regeneration process. With a multiple trap system such as the one illustrated for a four trap system, the mode valve contacts and the ratchet contacts would be arranged in numerical sequence around the housing. This arrangement will provide an evenly spaced series of reverse pressure pulses and consequently, a more steady flow to the Spiral burner. The ratchet actuations would be interspersed evenly between the periods of reverse flow.

Figure 19:
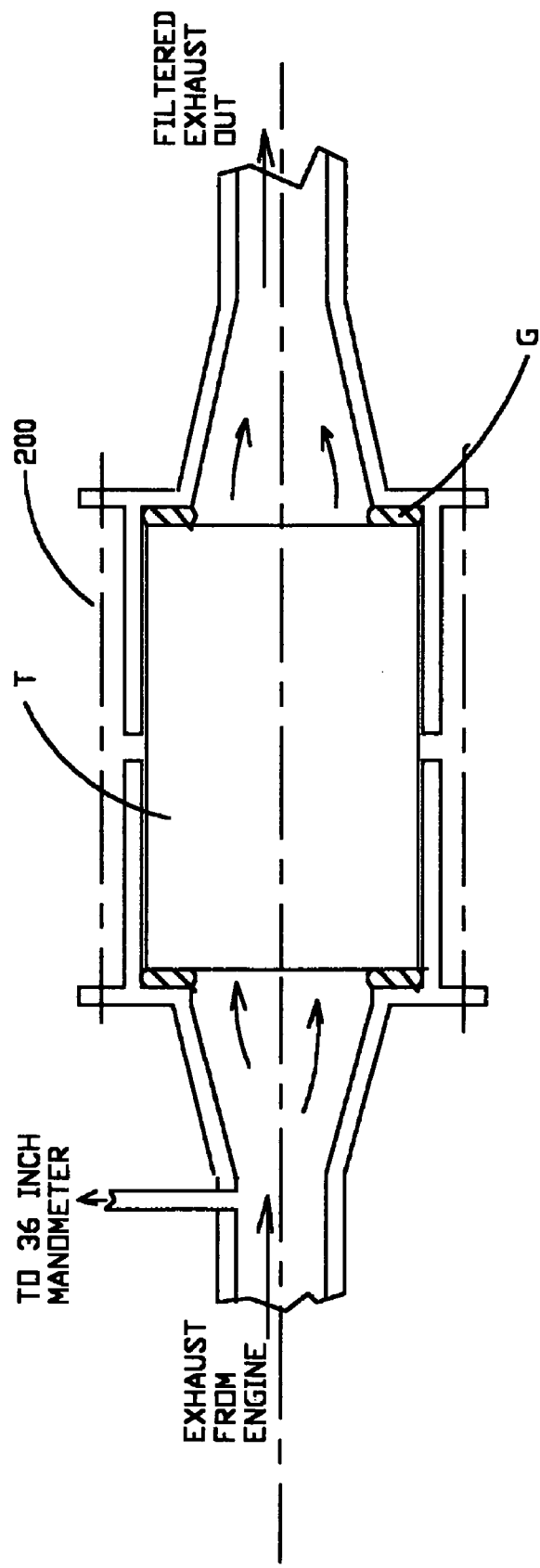
FIG. 19 is a cross-section of a rig used to load traps for testing.

FIG. 19 is a cross section of a test rig 200 used to load the trap by connection to the diesel engine exhaust as shown. The test engine (not shown) is a small 3600 rpm Onan diesel engine such as used for a generator set in recreational vehicles. The three cylinder four cycle engine has a displacement of 43.85 cubic inches (0.72 liters) and a rating of 16.6 HP at 3600 rpm and uses conventional No. 2 diesel fuel having less than 500 ppm sulfur. The load of the engine can be varied from idle, one air conditioner operating or two air conditioners operating (actual hp steps unknown). A 5.66 in.×6.00 in. particulate trap module T is loaded axially and the gaskets G define a 3.5 in. diameter opening at each end which provides an effective trap volume of 57.73 cubic inches (0.95 liters). As exhaust flows from the engine and through the trap T the pressure drop across the trap is measured by a manometer and the test is ended when the pressure drop totals 36 in. W.G. An effort was made to keep the same overall average load factor during operation, portions of which included idle and with one or two air conditioners.

The particulate traps T obtained for the tests were two 5.66 in. dia.×6 in. long Corning DuraTrap™ 200/12 modules, one of which was identified as and permanently labeled "A" and the other "B". Also obtained were two Corning DuraTrap™ 100/17 modules, one of which was identified as and permanently labeled "C" and the other "D". All of the new traps were dried at 400 degrees Fahrenheit for 4-5 hours and then weighed using a scale with an accuracy of plus or minus 0.01 grams. During the tests each of the traps used were similarly weighed following each loading and each regeneration of the traps.

Figure 20:
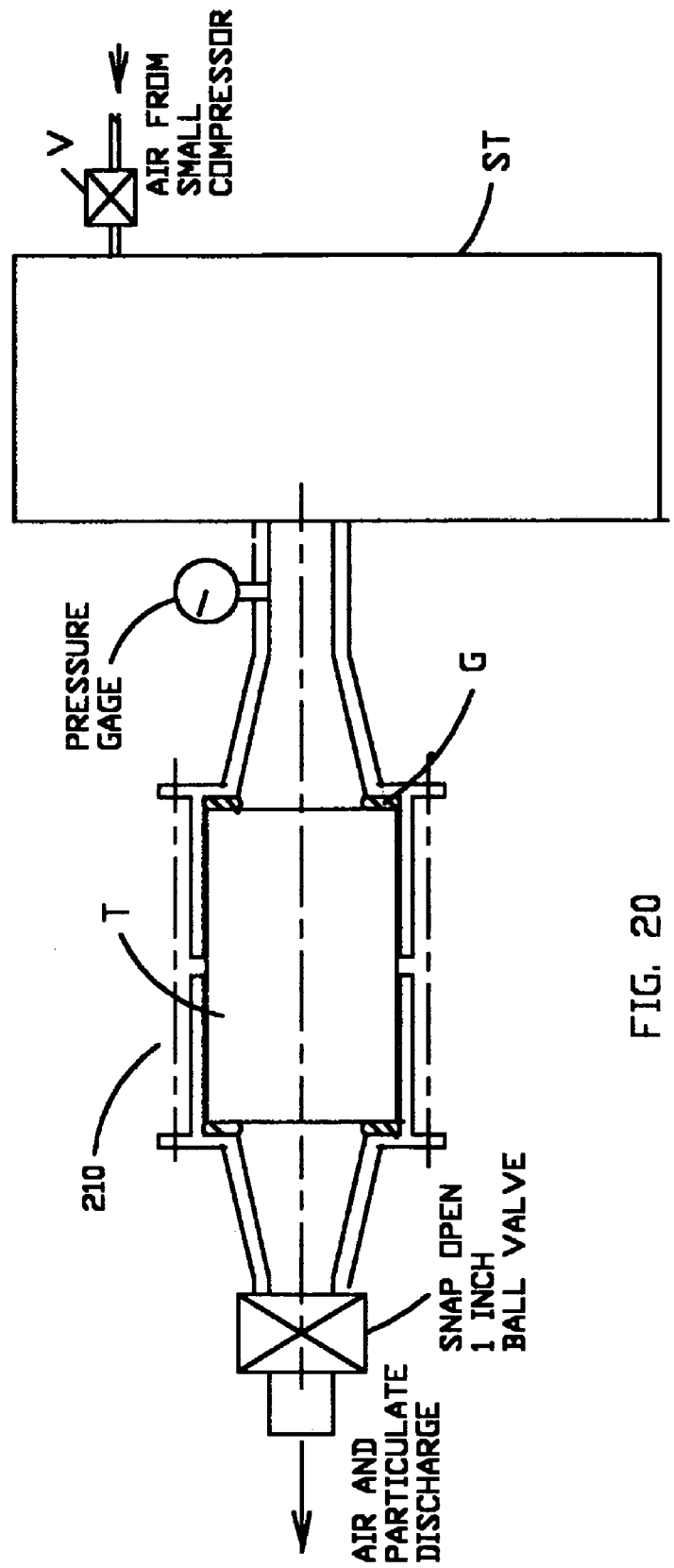
FIG. 20 is a cross-section of a rig used for evaluating regeneration at various reverse pressures.

FIG. 20 is a cross section of a trap regeneration test rig 210. It consists of the same trap holding and sealing arrangement. Two inch pipes are used to provide air under the desired reverse pressure to the clean end of the trap from a 5.5 cubic foot surge tank ST which is supplied from a small air compressor through a pressure reducing control valve V. Flow leaves the dirty end of the trap and, initially, is prevented from leaving the rig by a snap open one inch diameter ball valve. Thus, air pressure is permitted to gradually build up to a desired reverse pressure (eg. 35 psig, 20 psig, etc.).

Following stabilization of the air pressure at the desired level, the snap-open ball valve is very quickly snapped open. This results in an almost instantaneously applied reverse pressure across the porous walls and a similarly quick dislodgement of the particulate cake and removal of the resulting particles.

FIG. 21 lists the results of the various dry weight changes of a Corning DuraTrap™ 200/12 trap module starting with a new clean dry trap when regenerated with 35 psi reverse pressure drop.

Figure 22:
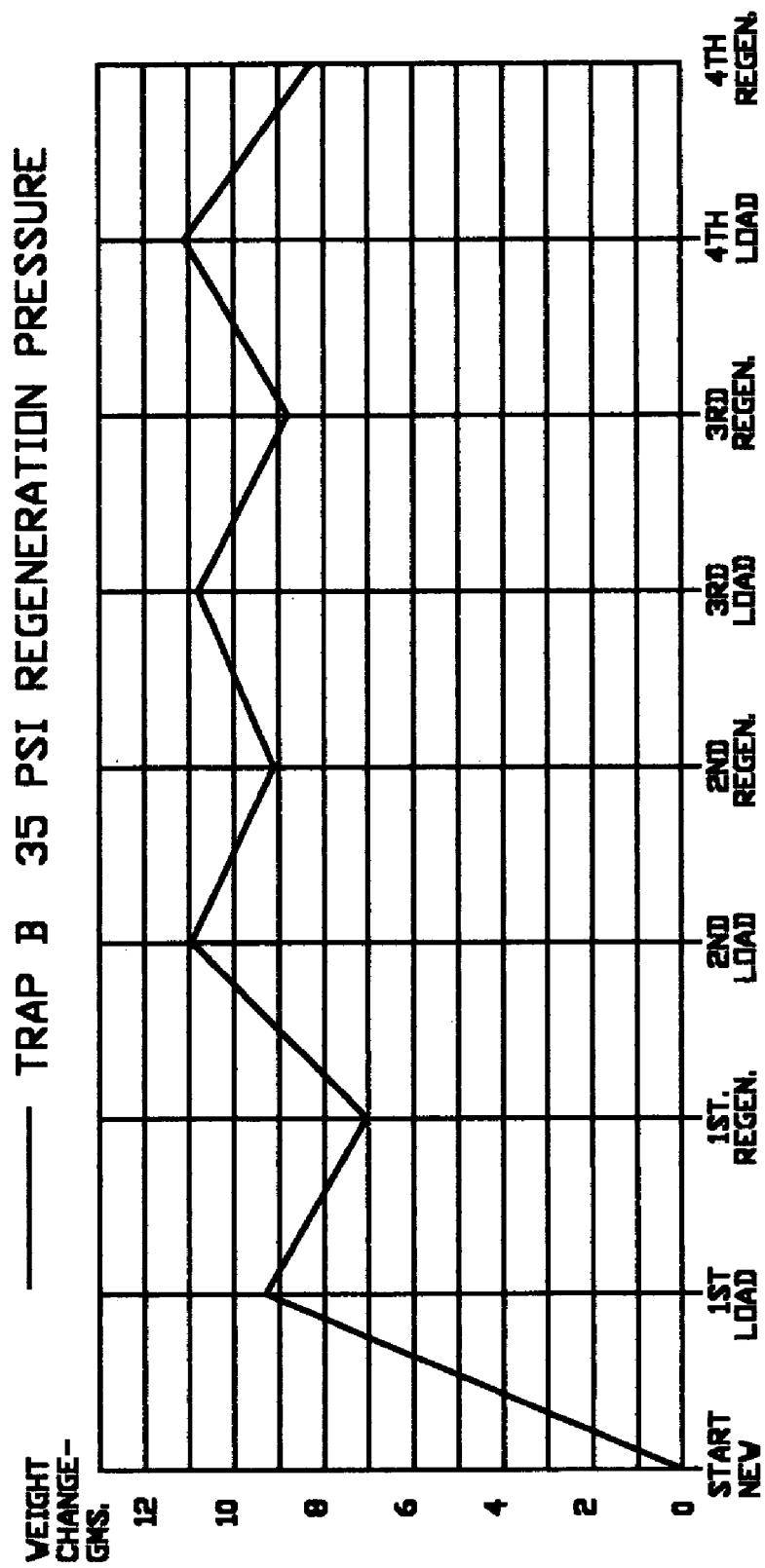
FIG. 22 is a graph of the particulate trap regeneration test results at 35 psi reverse pressure with a loaded Corning DuraTrap™ 200/12.

FIG. 22 is a graph of the data in FIG. 21 illustrating the dry trap weight gains following loading and the dry trap weight losses following regeneration. It can be seen that after the first two loadings and regenerations the weight gains during loading and weight loss following regeneration are equal. This shows the effectiveness of regeneration at 35 psi reverse pressure. This is a normal reverse pressure during exhaust braking obtained by closing a remote actuated relief valve (e.g. D-Celerator® 76 diesel exhaust brake).

FIG. 23 lists the results of the various dry trap weight changes of a Corning DuraTrap™ 100/17 trap module starting with a new clean dry trap when regenerated with 20 psi reverse pressure drop.

Figure 24:
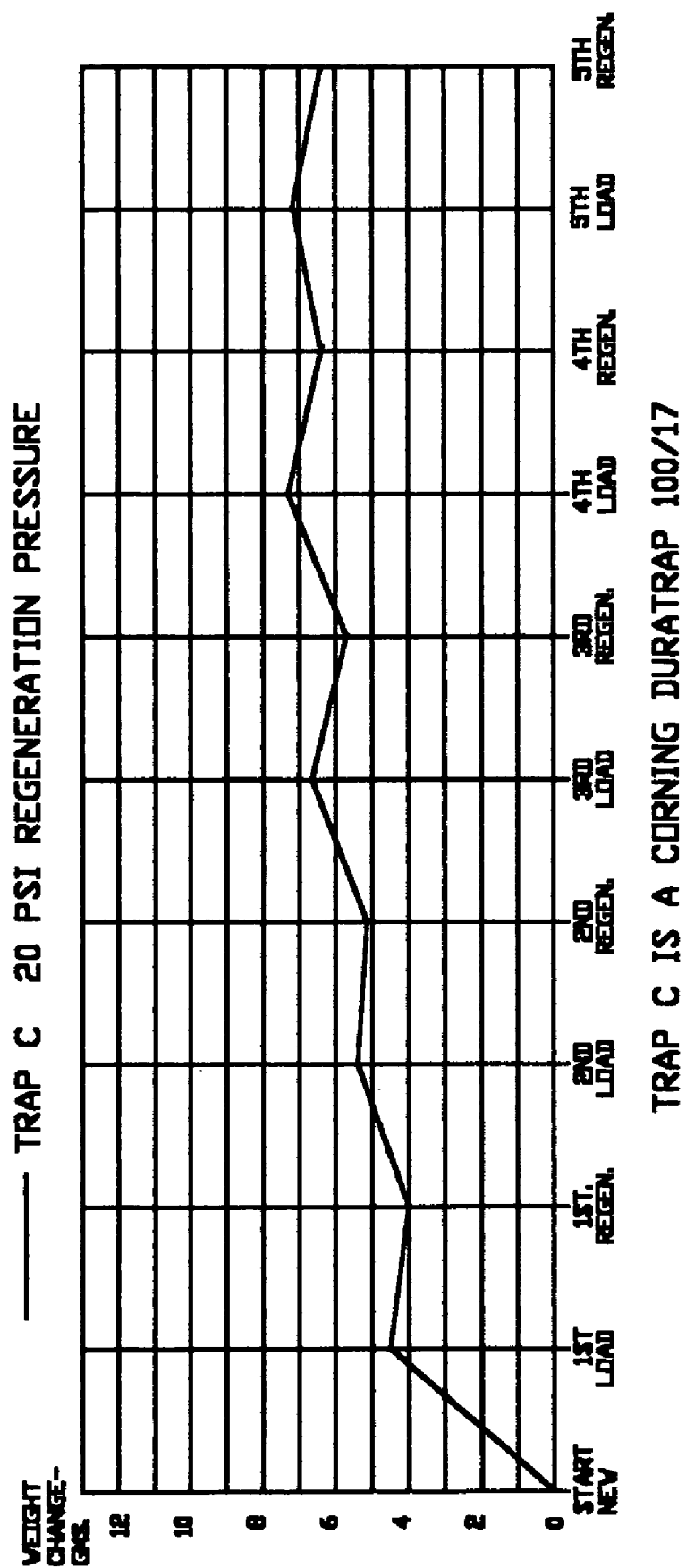
FIG. 24 is a graph of the particulate trap regeneration test results at 20 psi reverse pressure with a loaded Corning DuraTrap™ 100/17.

FIG. 24 is a graph of the data in FIG. 23 that illustrates the dry trap weight gains following loading and the dry trap weight losses following regeneration. It can be seen that after the first three loadings and regenerations the weight gains during loading and weight loss following regeneration are generally equal. This shows the effectiveness of the 22 psi reverse pressure obtained by closing the remote actuated relief valve (e.g. D-Celerator® 76 diesel exhaust brake) during engine low idle operation.

Movies were made of the reverse flow being emitted from the exit of the ball valve during a 20 psi regeneration and it was found that all of the added particulate was removed from the entire 0.95 liter trap in just 0.13 seconds! This very quick regeneration of a test trap of about the same size as the group of passages that will be selected, suggests that each step (phase 1 plus phase 2) of the regeneration process that was shown in FIG. 9 can be completed in one second instead of the ten seconds shown. Thus, the forty groups of selected passages of a twelve inch diameter trap can all be completely regenerated in just forty seconds instead of the earlier estimated seven minutes.

The very short regeneration time suggests that the safety timer, if used, would almost never be activated. It also suggests that it may be desirable to incorporate in on-road vehicles (FIG. 14) a tachometer signal similar to used in FIG. 13 but which would open a relay in the remote actuated relief valve line thus returning the trap exit pressure to normal as the engine slows down to low idle speed. This would limit regeneration to braking during deceleration and return the system to normal filtration as the vehicle idles when slowed or stopped. This very minor change would eliminate any possible pressure related interference with other emission controls and substantially prevent any increase in vehicle fuel consumption related to the particulate trap system.

The method of regenerating a wall-flow particulate trap having a plurality of contiguous porous walls for filtering particulate from an exhaust system of an internal combustion engine, includes the steps of:
creating a backpressure in the entire exhaust system from a location downstream of the trap; creating a reverse pressure drop across only a portion of the porous walls to dislodge accumulated particulate therefrom; and causing a portion of filtered exhaust gas to flow back through said portion of the porous walls to carry the dislodged particulate out of the trap.

While the exhaust system in which the trap 20 is used can be the usual system of an entire engine; there can be more than one exhaust system for an engine. For example an eight cylinder engine may have dual exhausts. In some very large engines there may be even more exhaust systems. Thus, while the above description discloses increasing the back pressure across the entire exhaust system, it should be understood that separate exhaust systems may or may not be simultaneously so increased.

It is deemed that there has been shown and described several embodiments of particulate trap systems, controls therefore, and methods of operation; however, it is to be understood that variations and modifications can be made thereto within the skill of those skilled in the art.

What is claimed is:

1. A particulate trap system for an exhaust system of an internal combustion engine, the system including:
    (a) a wall-flow particulate trap having a plurality of contiguous porous walls and having an inlet and an outlet;
    (b) an upstream conduit for carrying unfiltered exhaust gas from an internal combustion engine to the inlet of the trap;
    (c) a downstream conduit for carrying filtered exhaust gas from the outlet of the trap to the atmosphere, the pressure in the downstream conduit being less than the pressure in the upstream conduit to provide a forward pressure drop across the trap;
    (d) a remotely actuated valve in the downstream conduit for periodically increasing the pressure throughout the exhaust system upstream of the valve and including the trap;
    (e) a reversing apparatus for periodically creating a reverse pressure drop across a portion of the contiguous walls of the trap while allowing a forward pressure drop across the balance of the contiguous walls of the trap to dislodge accumulated particulate and cause a portion of the filtered exhaust gas to flow back through the portion of the contiguous porous walls from the outlet to the inlet to remove particulate therefrom while allowing the unfiltered exhaust gas to simultaneously flow through the balance of the contiguous porous walls from the inlet to the outlet for filtering; and
    (f) controls for actuating the valve and the reversing apparatus.

2. The particulate trap system of claim 1 wherein the valve has a first open position permitting unrestricted flow of filtered exhaust to the atmosphere and a second position restricting passage of the filtered exhaust until a pre-selected pressure level is reached.

3. The particulate trap system of claim 1 wherein the reversing apparatus includes a mode valve in the upstream conduit and movable between a first position allowing exhaust flow through the portion of the contiguous walls and a second position blocking such exhaust flow and creating the reverse pressure drop.

4. The particulate trap system of claim 3 wherein the mode valve is a two-way mode valve and wherein the system further includes a particulate disposal unit at ambient pressure and a stationary purge duct operatively connected to the two-way mode valve so that, in the first position, flow from the purge duct to the particulate disposal unit is blocked and flow of unfiltered engine exhaust passes through the purge duct to the portion of the contiguous walls and, in the second position, flow from the purge duct to the particulate disposal system is allowed and flow of unfiltered engine exhaust through the purge duct is blocked.

5. The particulate trap system of claim 1 wherein the reversing apparatus includes an indexing mechanism in the upstream conduit to periodically change the portion of the porous walls receiving the back flow of filtered exhaust gas so that the entire trap is systematically cleaned.

6. The particulate trap system of claim 5 wherein the indexing mechanism includes a duct rotor that is periodically rotated by a ratchet actuator operatively arranged to engage the duct rotor.

7. The particulate trap system of claim 6 wherein the trap has an inlet face and the duct rotor has a first end that is flat and smooth, and including a spring for lightly pressing the duct rotor against the inlet face of the trap to provide a seal between the duct rotor and the inlet face, and further including a stationary purge duct for receiving engine exhaust, the duct rotor having a second end connected to the stationary purge duct, and being constructed and arranged so that a portion of the engine exhaust passes to the selected portion of the passages of the trap to carry the dislodged particulate for disposal outside the trap.

8. The particulate trap system of claim 1 including a separator operative for receiving the particulate particles and for removing them from the reverse flow of filtered exhaust.

9. The particulate trap system of claim 1 wherein the controls are actuated following attainment of a pre-selected trap exhaust pressure drop during normal filtration operation of the engine.

10. The particulate trap system of claim 1 wherein the internal combustion engine is mounted in a vehicle, and the controls are actuated during deceleration of the vehicle, and wherein the increased pressure downstream of the trap exit resulting from closure of the remote actuated relief valve also increases engine backpressure which is effective as an exhaust brake, and the remotely actuated relief valve being constructed and arranged for use as an exhaust brake during periods of normal filtering operation between trap regenerations.

11. The particulate trap system of claim 1 wherein the controls effect regeneration of the trap, and so arranged that regeneration occurs during engine low idle operation or when the engine is operating at normal speeds.

12. The particulate trap system of claim 1 including a main timer, an auxiliary timer, and a sensor for determining that regeneration is needed,; and wherein the main timer starts operation when the sensor so determines, the main timer thereafter operating in concert with the auxiliary timer during the time the increased pressure is created and the particulate is being removed from the porous walls, the main timer being operative to de-energize the relief valve after particulate removal to cease the increased pressure and return the exit pressure to a normal pressure, and the controls being operative to return the particulate trap system to normal filtration until another regeneration is needed.

13. A particulate trap system for an exhaust system of an internal combustion engine, the system including:
  (a) a wall-flow particulate trap having an inlet face and a plurality of contiguous porous walls;
  (b) a remotely actuated valve downstream of the trap for periodically creating a reverse pressure throughout the exhaust system upstream of the valve and including the trap;
  (c) a reversing apparatus for periodically creating a reverse pressure drop across a portion of the contiguous porous walls of the trap to dislodge accumulated particulate and cause a portion of the filtered exhaust gas to flow back through the portion of the contiguous porous walls to remove particulate therefrom; and
  (d) controls for actuating the valve and the reversing apparatus;
wherein the reversing apparatus includes an indexing mechanism upstream of the trap to periodically change the portion of the porous walls receiving the back flow of filtered exhaust gas so that the entire trap is systematically cleaned, wherein the indexing mechanism includes a duct rotor that is periodically rotated by a ratchet actuator operatively arranged to engage the duct rotor, and including a mode valve at the upstream end of the trap and movable between a first position allowing exhaust flow through the portion of the contiguous walls and a second position blocking such exhaust flow and creating the reverse pressure drop, and when the mode valve is in its first position and the duct rotor pressures are balanced there is substantially no pressure induced force pressing the duct rotor against the trap inlet face; and arranged so that when the ratchet actuator is energized the duct rotor rotates to select a new group of passages having accumulated particulate, and when de-energized the duct rotor remains stationary, and when the mode valve is moved to its second position a pressure differential is created across walls of the duct rotor that dislodges and removes the collected particulate and the pressure differential increases the force pushing the duct rotor against the upstream end of the trap.

14. The particulate trap system of claim 13 wherein the controls include a timer for alternately energizing the mode valve and the ratchet actuator.

15. A particulate trap system for an exhaust system of an internal combustion engine, the system including:
  (a) a wall-flow particulate trap having a plurality of porous walls, an inlet, and an outlet;
  (b) an upstream conduit for carrying unfiltered exhaust gas from an internal combustion engine to the inlet of the trap;
  (c) a downstream conduit for carrying filtered exhaust gas from the outlet of the trap to the atmosphere, the pressure in the downstream conduit being less than the pressure in the upstream conduit to provide a forward pressure drop across the trap;
  (d) a valving mechanism in the downstream conduit for periodically increasing the pressure throughout the exhaust system upstream of the valving mechanism and including the trap;
  (e) a reversing apparatus operative after the pressure is increased for periodically creating a substantially instantaneous reverse pressure drop across a portion of the porous walls of the trap, while allowing a forward pressure drop across the balance of the trap, to dislodge accumulated particulate and cause a portion of the filtered exhaust gas to flow back through the portion of the porous walls from the outlet to the inlet to remove the dislodged particulate therefrom while allowing the unfiltered exhaust gas to simultaneously flow through the balance of the contiguous porous walls from the inlet to the outlet for filtering,
  (f) an indexing mechanism to periodically change the portion of the porous walls receiving the back flow of filtered exhaust gas; and
  (g) controls for actuating the valving mechanism and the reversing apparatus to start and stop a regeneration cycle.

16. The particulate trap system of claim 15 wherein the controls include a main timer to start and stop the regeneration cycle.

17. The particulate trap system of claim 16 wherein the controls include a first pressure switch which closes when the trap needs regeneration to energize the main timer.

18. The particulate trap system of claim 17 wherein the timer apparatus includes an auxiliary timer for controlling the indexing mechanism.

19. The particulate trap system of claim 18 wherein operation of the relief valve creates the increased pressure, and the event circuit de-energizes the main timer and connects it to the auxiliary timer, and places the indexing mechanism under control of the auxiliary timer.

20. The particulate trap system of claim 19 wherein the reversing apparatus includes a mode valve at an upstream end of the trap and movable between a first position allowing exhaust flow through the portion of the porous walls and a second position blocking such exhaust flow and creating the reverse pressure drop; and wherein the auxiliary timer also controls the mode valve.

21. The particulate trap system of claim 20 wherein the controls include a second pressure switch which closes in response to a preselected level of the reverse pressure and re-energizes the main timer and energizes the auxiliary timer.

22. A system for regenerating a particulate trap in an exhaust system of an internal combustion engine, the system including:
  (a) a wall-flow particulate trap having an inlet face, an outlet, and a plurality of porous walls for filtering engine exhaust and removing particulates therefrom to form a particulate cake on the porous walls;
  (b) an upstream conduit for carrying unfiltered exhaust gas at a pressure from an internal combustion engine to the inlet of the trap;
  (c) a downstream conduit for carrying filtered exhaust gas at a pressure from the outlet of the trap to the atmosphere, the pressure in the downstream conduit being less than the pressure in the upstream conduit to provide a forward pressure drop across the trap;
  (d) a valving mechanism in the downstream conduit for periodically starting a regeneration cycle by increasing the pressure in the downstream conduit between the trap and the valving mechanism;

(e) a reversing apparatus operative after the increased pressure is created for periodically creating a substantially instantaneous reverse pressure drop across a portion of the porous walls of the trap to dislodge accumulated particulate cake and causing the filtered exhaust gas to flow back through the porous walls to remove the dislodged particulate from the trap while allowing the unfiltered exhaust gas to simultaneously flow through the balance of the contiguous porous walls, the reversing apparatus including:
  (i) a stationary purge duct in the upstream conduit; and
  (ii) an indexing mechanism upstream of the trap to periodically change the portion of the porous walls receiving the backflow of filtered gas so that the entire trap is systematically regenerated, the indexing mechanism including a duct rotor having a first end that is flat and smooth, a second end connected to the stationary purge duct, and a spring for lightly pressing the first end against the inlet face of the trap, and a ratchet actuator operatively arranged to engage the duct rotor for periodically rotating the duct rotor to a new position; and
(f) controls for starting and stopping the regeneration cycle.

23. A system for regenerating a particulate trap in an exhaust system of an internal combustion engine, the system including:
(a) a wall-flow particulate trap having an inlet face, an outlet, and a plurality of porous walls for filtering engine exhaust and removing particulates therefrom to form a particulate cake on the porous walls;
(b) an upstream conduit for carrying unfiltered exhaust gas at a pressure from an internal combustion engine to the inlet of the trap;
(c) a downstream conduit for carrying filtered exhaust gas at a pressure from the outlet of the trap to the atmosphere, the pressure in the downstream conduit being less than the pressure in the upstream conduit to provide a forward pressure drop across the trap;
(d) a valving mechanism in the downstream conduit for periodically starting a regeneration cycle by increasing the pressure in the downstream conduit between the trap and the valving mechanism;
(e) a reversing apparatus operative after the increased pressure is created for periodically creating a substantially instantaneous reverse pressure drop across a portion of the porous walls of the trap to dislodge accumulated particulate cake and causing the filtered exhaust gas to flow back through the porous walls to remove the dislodged particulate from the trap while allowing the unfiltered exhaust gas to simultaneously flow through the balance of the contiguous porous walls, the reversing apparatus including:
  (i) a stationary purge duct in the upstream conduit; and
  (ii) an indexing mechanism upstream of the trap to periodically change the portion of the porous walls receiving the backflow of filtered gas so that the entire trap is systematically regenerated, the indexing mechanism including a duct rotor and a ratchet actuator operatively arranged to engage the duct rotor for periodically rotating the duct rotor to a new position;
(f) controls for starting and stopping the regeneration cycle; and
(g) a mode valve at the upstream end of the trap and movable between a first position allowing exhaust flow through the portion of the contiguous walls and a second position blocking such exhaust flow and creating the reverse pressure drop, and when the mode valve is in its first position and the duct rotor pressures are balanced there is substantially no pressure induced force pressing the duct rotor against the trap inlet face; and arranged so that when the ratchet actuator is energized the duct rotor rotates to select a new group of passages having accumulated particulate; and when de-energized the duct rotor remains stationary; and when the mode valve is moved to its second position a pressure differential is created across the walls of the duct rotor that dislodges and removes the collected particulate and the pressure differential increases the force pushing the duct rotor against the upstream end of the trap.

24. A particulate trap system for filtering particulates from an exhaust gas from an internal combustion engine before release to the atmosphere and for periodically regenerating the trap by removing accumulated particulate cake from the trap, the particulate trap system comprising:
(a) a cylindrical particulate trap for filtering particulates from an exhaust gas, the trap having a plurality of contiguous passages with porous walls, an inlet with a circular face, and an outlet;
(b) an upstream conduit for carrying unfiltered exhaust gas from an internal combustion engine to the inlet of the trap;
(c) a downstream conduit for carrying filtered exhaust gas from the outlet of the trap to the atmosphere;
(d) a relief valve in the downstream conduit having a normal position that allows unrestricted flow of filtered exhaust gas and having a regeneration position that restricts flow of filtered exhaust gas until a selected pressure develops in the downstream conduit between the outlet of the trap and the relief valve;
(e) a purge duct system for periodically regenerating the trap by reversing the flow of gas through successive portions of the trap to dislodge and entrain accumulated particulate cake, the purge duct system comprising:
  (i) a disposal system for disposing of entrained particulate cake;
  (ii) a rotary duct with an opening that communicates with a portion of the inlet of the trap, and with succeeding portions of the inlet of the trap when it rotates, while leaving substantially the balance of the inlet in direct communication with the upstream conduit;
  (iii) an actuator for rotating the rotary duct around the inlet of the trap during regeneration;
  (iv) a stationary duct that communicates with the rotary duct, with the disposal system, and with the upstream conduit; and
  (v) a mode valve in the stationary duct having a normal position that allows the flow of gas from the upstream conduit to the portion of the trap in communication with the rotary duct and prevents the flow of gas to the disposal system, and having a regeneration position that allows the flow of gas from the portion of the trap in communication with the rotary duct to the disposal system and prevents the flow of gas from the upstream conduit to the portion of the trap in communication with the rotary duct; and
(f) a control system for moving the relief valve and the mode valve between their normal positions and their regeneration positions to periodically regenerate the trap.

25. The particulate trap system of claim 24 wherein the opening of the rotary duct is pie-shaped and wherein the opening is biased against the inlet of the trap by a spring to create a seal between the opening and the inlet.

26. The particulate trap system of claim 25 wherein the actuator comprises a ratchet drive that rotates the rotary duct in discrete steps.

27. The particulate trap system of claim 26 wherein the mode valve moves to its regeneration position only when the rotary duct is stationary.

28. The particulate trap system of claim 27 wherein a portion of the stationary duct containing the mode valve is located in the upstream conduit.

* * * * *